United States Patent
Huang et al.

(10) Patent No.: US 11,208,338 B2
(45) Date of Patent: *Dec. 28, 2021

(54) SELENIUM REMOVAL USING ALUMINUM SALT AT CONDITIONING AND REACTION STAGES TO ACTIVATE ZERO-VALENT IRON (ZVI) IN PIRONOX PROCESS

(71) Applicants: The Texas A&M University System, College Station, TX (US); Evoqua Water Technologies LLC, Warrendale, PA (US)

(72) Inventors: Yongheng Huang, College Station, TX (US); Michael Wismer, Lino Lakes, MN (US); Lew Andrew Reyes, Singapore (SG); Xiangyi Qiao, Singapore (SG); Simon Dukes, Chelmsford, MA (US); Frank Sassaman, Fombell, PA (US); David Berger, Wampum, PA (US)

(73) Assignees: Evoqua Water Technologies LLC, Warrenville, PA (US); The Texas A&M University System, College Station, TX (US)

( * ) Notice: Subject to any disclaimer, the term of this patent is extended or adjusted under 35 U.S.C. 154(b) by 229 days.

This patent is subject to a terminal disclaimer.

(21) Appl. No.: 16/527,900

(22) Filed: Jul. 31, 2019

(65) Prior Publication Data
US 2019/0352203 A1    Nov. 21, 2019

Related U.S. Application Data

(63) Continuation of application No. 15/355,927, filed on Nov. 18, 2016, now Pat. No. 10,377,648, which is a
(Continued)

(51) Int. Cl.
*C02F 1/70* (2006.01)
*B01J 20/02* (2006.01)
(Continued)

(52) U.S. Cl.
CPC ........... *C02F 1/705* (2013.01); *B01J 20/0225* (2013.01); *B01J 20/0229* (2013.01); *C02F 1/281* (2013.01);
(Continued)

(58) Field of Classification Search
None
See application file for complete search history.

(56) References Cited

U.S. PATENT DOCUMENTS

| 4,599,177 A | 7/1986 | Hayashi |
| 5,389,262 A | 2/1995 | Guess |

(Continued)

FOREIGN PATENT DOCUMENTS

| CN | 1861093 A | 11/2006 |
| CN | 1926071 A | 3/2007 |

(Continued)

OTHER PUBLICATIONS

Cahan, B.D., and C.-T. Chen, "The Nature of the Passive Film on Iron. III. The Chemi-Conductor Model and Further Supporting Evidence," Journal of The Electrochemical Society 129(5) 921-925, 1982.
(Continued)

*Primary Examiner* — Clare M Perrin
(74) *Attorney, Agent, or Firm* — Christensen O'Connor Johnson Kindness PLLC

(57) ABSTRACT

A system containing a reactor vessel including zero valent iron media, a source of a conditioning additive, a source of a reaction additive, and a process control subsystem is disclosed. A method for reducing a concentration of one or
(Continued)

more contaminants in contaminated water including contacting zero valent iron media with a conditioning additive, contacting contaminated water with conditioned zero valent iron media, and introducing a reaction additive is also disclosed. The conditioning additive and reaction additive may each contain an aluminum salt.

14 Claims, 26 Drawing Sheets

Related U.S. Application Data continuation-in-part of application No. 13/071,343, filed on Mar. 24, 2014, now abandoned, which is a continuation-in-part of application No. PCT/US2010/049528, filed on Sep. 20, 2010.

(60) Provisional application No. 62/256,734, filed on Nov. 18, 2015, provisional application No. 61/357,466, filed on Jun. 22, 2010, provisional application No. 61/351,194, filed on Jun. 3, 2010, provisional application No. 61/243,875, filed on Sep. 18, 2009.

(51) Int. Cl.

| | |
|---|---|
| C02F 1/28 | (2006.01) |
| C02F 1/52 | (2006.01) |
| B01J 21/02 | (2006.01) |
| B01J 23/745 | (2006.01) |
| B01J 37/02 | (2006.01) |
| C02F 1/00 | (2006.01) |
| C02F 1/74 | (2006.01) |
| C02F 101/10 | (2006.01) |
| C02F 101/20 | (2006.01) |
| C02F 103/06 | (2006.01) |
| C02F 103/18 | (2006.01) |
| C02F 103/36 | (2006.01) |
| C02F 1/66 | (2006.01) |

(52) U.S. Cl.
CPC ............. *C02F 1/5245* (2013.01); *B01J 21/02* (2013.01); *B01J 23/745* (2013.01); *B01J 37/0201* (2013.01); *C02F 1/001* (2013.01); *C02F 1/66* (2013.01); *C02F 1/74* (2013.01); *C02F 2101/103* (2013.01); *C02F 2101/106* (2013.01); *C02F 2101/20* (2013.01); *C02F 2103/06* (2013.01); *C02F 2103/18* (2013.01); *C02F 2103/365* (2013.01); *C02F 2209/005* (2013.01); *C02F 2209/40* (2013.01)

(56) References Cited

U.S. PATENT DOCUMENTS

| | | | |
|---|---|---|---|
| 5,620,607 A | 4/1997 | Bowie, Jr. | |
| 5,635,073 A | 6/1997 | Aktor | |
| 5,798,043 A | 8/1998 | Khudenko | |
| 5,833,388 A | 11/1998 | Edwards | |
| 5,975,800 A | 11/1999 | Edwards | |
| 6,132,623 A | 10/2000 | Nikolaidis | |
| 6,193,858 B1 | 2/2001 | Hradil | |
| 6,207,114 B1 | 3/2001 | Quinn | |
| 6,254,786 B1 | 7/2001 | Carpenter | |
| 6,322,701 B1 | 11/2001 | Delighiannis | |
| 6,358,396 B1 | 3/2002 | Gu | |
| 6,432,693 B1 | 8/2002 | Hince | |
| 6,531,065 B2 | 3/2003 | Gurol | |
| 6,719,902 B1 | 4/2004 | Alvarez | |
| 6,761,827 B2 | 7/2004 | Coffey | |
| 6,770,483 B2 | 8/2004 | Lyon | |
| 6,833,075 B2 | 12/2004 | Hughes | |
| 6,921,477 B2 | 7/2005 | Wilhelm | |
| 6,942,807 B1 | 9/2005 | Meng | |
| 6,982,040 B2 | 1/2006 | Costa | |
| 7,008,964 B2 | 3/2006 | Clausen | |
| 7,025,887 B1 | 4/2006 | Kirts | |
| 7,147,786 B2 | 12/2006 | Costa | |
| 7,160,465 B2 | 1/2007 | Kirts | |
| 7,201,841 B2 | 4/2007 | Hughes | |
| 7,238,278 B2 | 7/2007 | Coffey | |
| 7,255,793 B2 | 8/2007 | Cort | |
| 7,320,761 B2 | 1/2008 | Costa | |
| 7,329,349 B2 | 2/2008 | Hill | |
| 7,393,452 B2 | 7/2008 | Tay | |
| 7,470,369 B2 | 12/2008 | Diallo | |
| 7,476,324 B2 | 1/2009 | Ciampi | |
| 7,531,089 B2 | 5/2009 | Mankiewicz | |
| 7,540,966 B2 | 6/2009 | Costa | |
| 7,572,378 B2 | 8/2009 | Rosen | |
| 7,575,682 B2 | 8/2009 | Olsta | |
| 7,611,637 B2 | 11/2009 | Zhang | |
| 7,758,755 B2 | 7/2010 | Diallo | |
| 7,785,468 B2 | 8/2010 | Baseeth | |
| 7,850,854 B2 | 12/2010 | Gurol | |
| 7,854,330 B2 | 12/2010 | Olsta | |
| 7,897,049 B2 | 3/2011 | Ghosh | |
| 8,025,800 B2 | 9/2011 | Kane | |
| 8,048,317 B2 | 11/2011 | Rima | |
| 8,057,675 B2 | 11/2011 | Baseeth | |
| 8,057,682 B2 | 11/2011 | Hoag | |
| 8,071,055 B2 | 12/2011 | Newcombe | |
| 8,080,163 B2 | 12/2011 | Moller | |
| 8,101,087 B2 | 1/2012 | Kane | |
| 8,114,279 B2 | 2/2012 | Jin | |
| 2003/0132160 A1 | 7/2003 | Khudenko | |
| 2003/0196961 A1 | 10/2003 | Santina | |
| 2004/0134857 A1 | 7/2004 | Huling | |
| 2005/0051493 A1 | 3/2005 | Hensman | |
| 2005/0103707 A1 | 5/2005 | Olsta | |
| 2005/0133458 A1 | 6/2005 | Gurol | |
| 2006/0032803 A1 | 2/2006 | Costa | |
| 2006/0049091 A1 | 3/2006 | Cheetham | |
| 2006/0175266 A1 | 8/2006 | Rima | |
| 2006/0249465 A1 | 11/2006 | Jin | |
| 2006/0286888 A1 | 12/2006 | Olsta | |
| 2006/0289349 A1 | 12/2006 | Hughes | |
| 2007/0029894 A1 | 2/2007 | Cort | |
| 2007/0119785 A1 | 3/2007 | Englehardt | |
| 2007/0158275 A1 | 7/2007 | Zhang | |
| 2007/0163958 A1 | 7/2007 | Newcombe | |
| 2007/0181511 A1 | 8/2007 | Smith | |
| 2007/0209989 A1 | 9/2007 | Hayashi | |
| 2007/0227981 A1 | 10/2007 | Olsta | |
| 2007/0241063 A1 | 10/2007 | St-Laurent | |
| 2007/0256985 A1 | 11/2007 | Zhao | |
| 2008/0073280 A1 | 3/2008 | Cort | |
| 2008/0073281 A1 | 3/2008 | Cort | |
| 2008/0073282 A1 | 3/2008 | Cort | |
| 2008/0073283 A1 | 3/2008 | Cort | |
| 2008/0073284 A1 | 3/2008 | Cort | |
| 2008/0135491 A1 | 6/2008 | Cort | |
| 2008/0161184 A1 | 7/2008 | Tseng | |
| 2008/0185341 A1 | 8/2008 | Diallo | |
| 2008/0264876 A1 | 10/2008 | Block | |
| 2008/0311288 A1 | 12/2008 | Dong | |
| 2009/0127208 A1 | 5/2009 | Berkowitz | |
| 2009/0191084 A1 | 7/2009 | Liskowitz | |
| 2009/0200233 A1 | 8/2009 | Bergendahl | |
| 2009/0200246 A1 | 8/2009 | King | |
| 2009/0272698 A1 | 11/2009 | Hill | |
| 2009/0298165 A1 | 12/2009 | Wiedemann | |
| 2010/0126944 A1 | 5/2010 | Braida | |
| 2010/0126945 A1 | 5/2010 | Patel | |
| 2010/0140185 A1 | 6/2010 | Hill | |
| 2010/0147769 A1 | 6/2010 | Kane | |
| 2010/0227381 A1 | 9/2010 | Hoag | |
| 2010/0276360 A1 | 11/2010 | Smith | |
| 2010/0282690 A1 | 11/2010 | Padmanabhan | |
| 2010/0307980 A1 | 12/2010 | Tranter | |
| 2011/0000854 A1 | 1/2011 | Nichols | |

(56) References Cited

U.S. PATENT DOCUMENTS

| | | |
|---|---|---|
| 2011/0017671 A1 | 1/2011 | Alley, Jr. |
| 2011/0094972 A1 | 4/2011 | King |
| 2011/0114563 A1 | 5/2011 | Kane |
| 2011/0120929 A1 | 5/2011 | Ghosh |
| 2011/0139726 A1 | 6/2011 | Jin |
| 2011/0174743 A1 | 7/2011 | Huang |
| 2011/0309021 A1 | 12/2011 | Jin |
| 2011/0309023 A1 | 12/2011 | Kane |
| 2012/0055873 A1 | 3/2012 | Hoag |

FOREIGN PATENT DOCUMENTS

| | | |
|---|---|---|
| WO | 95/06004 A1 | 3/1995 |
| WO | 95/06005 A1 | 3/1995 |
| WO | 98/49106 A1 | 11/1998 |
| WO | 99/28243 A1 | 6/1999 |
| WO | 99/65830 A1 | 12/1999 |
| WO | 2004/071960 A2 | 8/2004 |
| WO | 2004/099093 A1 | 11/2004 |
| WO | 2005/014482 A2 | 2/2005 |
| WO | 2005/042412 A1 | 5/2005 |
| WO | 2005/102942 A1 | 11/2005 |
| WO | 2006/065825 A2 | 6/2006 |
| WO | 2007/092914 A2 | 8/2007 |
| WO | 2008/039936 A2 | 4/2008 |
| WO | 2008/119063 A1 | 10/2008 |
| WO | 2008/136814 A2 | 11/2008 |
| WO | 2011/035263 A2 | 3/2011 |
| WO | 2011/046943 A1 | 4/2011 |
| WO | 2011/056203 A2 | 5/2011 |

OTHER PUBLICATIONS

Huang, Y.H., and T.C. Zhang, "Effects of Dissolved Oxygen on Formation of Corrosion Products and Concomitant Oxygen and Nitrate Reduction in Zero-Valent Iron Systems With or Without Aqueous $FE^2$," Water Research 39(9):1751-1760, May 2005.

Huang, Y.H., and T.C. Zhang, "Enhancement of Nitrate Reduction in $Fe^0$-Packed Columns by Selected Cations," Journal of Environmental Engineering 131(4):603-611, Apr. 2005.

Huang, Y.H., and T.C. Zhang, "Kinetics of Nitrate Reduction by Iron at Near Neutral pH," Journal of Environmental Engineering 128(7):604-611, Jul. 2002.

Huang, Y.H., and T.C. Zhang, "Nitrite Reduction and Formation of Corrosion Coatings in Zerovalent Iron Systems," Chemosphere 64(6):937-943, Aug. 2006.

Huang, Y.H., and T.C. Zhang, "Reduction of Nitrobenzene and Formation of Corrosion Coatings in Zerovalent Iron Systems," Water Research 40(16):3075-3082, Sep. 2006.

Huang, Y.H., et al., "Effects of Oxide Coating and Selected Cations on Nitrate Reduction by Iron Metal," Journal of Environmental Quality 32(4):1306-1315, Jul./Aug. 2003.

Kanel, S.R., et al., "Removal of Arsenic(III) From Groundwater by Nanoscale Zero-Valent Iron," Environmental Science & Technology 39(5):1291-1298, Mar. 2005.

Meng, X., et al., "Removal of Selenocyanate From Water Using Elemental Iron," Water Research 36(15):3867-3873, Sep. 2002.

Ponder, S.M., et al., "Remediation of Cr(VI) and Pb(II) Aqueous Solutions Using Supported, Nanoscale Zero-Valent Iron," Environmental Science & Technology 34(12):2564-2569, Jun. 2000.

Shaw, J.A., "The Design of Draft Tube Circulators," Proceedings of the Australasian Institute of Mining and Metallurgy 283:47-58, Sep. 1982.

Wang, J., et al., "Performance and Characteristics of an Anaerobic Baffled Reactor," Bioresource Technology 93(2):205-208, Jun. 2004.

Zhang, T.C., and Y.H. Huang, "Effects of Surface-Bound $FE^{2+}$ on Nitrate Reduction and Transformation of Iron Oxide(s) in Zero-Valent Iron Systems at Near-Neutral pH," Journal of Environmental Engineering 132(5):527-536, May 2006.

Zhang, T.C., and Y.H. Huang, "Profiling Iron Corrosion Coating on Iron Grains in a Zerovalent Iron System Under the Influence of Dissolved Oxygen," Water Research 40(12):2311-2320, Jul. 2006.

Huang, Y., "Nitrate Degradataion By $Fe^0$: Mechanisms, Kinetics, and the Role of Iron Oxide Coatings," doctoral dissertation, University of Nebraska, Lincoln, Nebraska, 2002, 260 pages.

International Preliminary Report on Patentability dated Mar. 20, 2012, issued in International Application No. PCT/US2010/049528, filed Sep. 20, 2010, 5 pages.

International Search Report dated May 31, 2011, issued in International Application No. PCT/US2010/049528, filed Sep. 20, 2010, 3 pages.

Notification of the First Office Action dated Aug. 30, 2012, issued in Chinese Application No. 201080052261.8, filed Sep. 20, 2010, 8 pages.

Extended European Search Report dated Oct. 1, 2013, issued in European Application No. 10817988.8, filed Sep. 20, 2010, 9 pages.

Chinese Rejection Decision dated Jun. 8, 2015, issued in related Chinese Application No. 201080052261.8, filed Sep. 20, 2010, 8 pages.

Eurasian Official Action dated Apr. 7, 2015, and Russian foreign associate's comments dated Jun. 8, 2015, issued in Eurasian Application No. 201290898, filed Sep. 20, 2010, 5 pages.

Zhang, Y., et al., "Effect of Arsenate and Molybdate on Removal of Selenate From an Aqueous Solution by Zero-Valent Iron," Science of the Total Environment 350(1-3):1-11, Nov. 2005.

Zhang, Y., et al., "Removal of Selenate from Water by Zerovalent Iron," Journal of Environmental Quality 34(2), Mar. 2005, 1 page.

Chu, P., "Treatment Technology Summary for Critical Pollutants of Concern in Power Plant Wastewaters," Electric Power Research Institute, Technical Update, Jan. 2007, pp. 1-88.

Communication Pursuant to Article 94(3) EPC dated May 16, 2017, issued in corresponding European Application No. 10817988.8, filed Sep. 20, 2010, 8 pages.

Communication Pursuant to Article 94(3) EPC dated Feb. 2, 2018, issued in corresponding European Application No. 10817988.8, filed Sep. 20, 2010, 6 pages.

Office Action (Requisition) dated Nov. 7, 2018, issued in Canadian Application No. 2,787,032, filed Sep. 20, 2010, 3 pages.

Chinese First Office Action dated Feb. 1, 2019, issued in corresponding Chinese Application No. 201610899705.0, filed Sep. 20, 2010, 15 pages.

Safety Data Sheet, Aluminum Chloride, Sigma-Aldrich Corporation, Oct. 2, 2017, Version 4.17, 8 pages.

Chinese Office Action dated Dec. 4, 2019, issued in corresponding Chinese Application No. 201610899705.0, filed Sep. 20, 2010, 10 pages.

SELENIUM REMOVAL USING ALUMINUM SALT AT CONDITIONING AND REACTION STAGES TO ACTIVATE ZERO-VALENT IRON (ZVI) IN PIRONOX PROCESS

CROSS-REFERENCE TO RELATED APPLICATIONS

This application is a continuation of application Ser. No. 15/355,927, filed Nov. 18, 2016, which claims the benefit of Application No. 62/256,734 titled "Selenium Removal using Aluminum Salt at Conditioning and Reaction Stages to Activate Zero Valent Iron in Pironox™ Process" filed on Nov. 18, 2015; and is a continuation-in-part of application Ser. No. 13/071,343, filed Mar. 24, 2011, which is a continuation-in-part of PCT/US2010/049528, filed Sep. 20, 2010, which claims priority to Application No. 61/357,466, filed Jun. 22, 2010, Application No. 61/351,194, filed Jun. 3, 2010, and Application No. 61/243,875, filed Sep. 18, 2009; each expressly Incorporated herein by reference in its entirety.

FIELD OF TECHNOLOGY

Aspects and embodiments disclosed herein relate to a system and method for reducing a concentration of one or more contaminants in contaminated water. More particularly, aspects and embodiments disclosed relate to systems and methods including zero valent iron media in contact with one of a conditioning additive and a reaction additive.

BACKGROUND OF THE INVENTION

Wastewater generated from machinery such as coal-fired electric power plants, petroleum refineries, and those related to mining operations may be contaminated with selenium and other metal and metalloids. Selenium can be toxic at elevated levels and some selenium species may be carcinogenic. Selenium exists in various forms in nature and treatment of selenium contaminated water and wastewater is complicated.

In order to meet increasingly stringent environmental regulations, a cost-effective and reliable technology which is capable of treating such complicated wastewater is urgently required. The present invention seeks to fulfill this need and provides further related advantages.

SUMMARY OF THE INVENTION

In accordance with an aspect, there is provided a system comprising a reactor vessel, zero valent iron media disposed within the reactor vessel, and a process control subsystem comprising a control module. The reactor vessel may further comprise an inlet, an outlet, and a side wall. The zero valent iron media may be at least partially coated with one or more iron oxide compounds. The reactor vessel may be configured to receive a conditioning additive comprising a soluble aluminum salt through the at least one inlet, and contact the zero valent iron media with the conditioning additive to produce a conditioned zero valent iron media. The reactor vessel may be configured to receive a contaminated water and a reaction additive comprising a soluble aluminum salt through the at least one inlet and contact the conditioned zero valent iron media with the contaminated water and the reaction additive. The control module may be configured to maintain a predetermined concentration of aluminum ions in a solution within the reactor vessel.

In some embodiments, the process control subsystem further comprises a first sensor system and a second sensor system in electrical communication with the control module, the control module configured to receive information from the first and second sensor systems. The first sensor system may be configured to measure at least one of a flowrate of a solution being received in the reactor vessel through the at least one inlet and a concentration of one or both of the conditioning additive and the reaction additive. The second sensor system may be configured to measure a concentration of one or both of the conditioning additive and the reaction additive in the solution within the reactor vessel.

In some embodiments, the control module is configured to maintain a predetermined concentration of aluminum ions in the solution within the reactor vessel by adjusting a flowrate of the reaction additive responsive to a result of an analysis of the information from the first and second sensors.

In some embodiments, at least one of the conditioning additive and the reaction additive comprises aluminum chloride. The conditioning additive may comprise aluminum chloride and sodium nitrate.

In some embodiments, the zero valent iron media is disposed in a media bed selected from the group consisting of a packed bed, a fluidized bed, and a mixed bed.

In some embodiments, the system may be configured to reduce a concentration of one or more contaminants in the contaminated water selected from the group consisting of selenium, arsenic, cadmium, chromium III, chromium VI, cobalt, copper, lead, mercury, antimony, molybdenum, nickel, titanium, tungsten, vanadium, and zinc.

In some embodiments the process control subsystem comprises a third sensor system in electrical communication with the control module and configured to measure at least one of a concentration of aluminum ions in a solution exiting the reactor vessel through the outlet and a flowrate of the solution exiting the reactor vessel through the outlet.

In accordance with an aspect, there is provided a method for reducing a concentration of one or more contaminants in a contaminated water, the method comprising providing zero valent iron media in a reactor vessel, contacting the zero valent iron media with a conditioning additive to produce a conditioned zero valent iron media, contacting the contaminated water with the conditioned zero valent iron media to produce a product water having a concentration of contaminants lower than the concentration of contaminants in the contaminated water, and introducing a reaction additive into the reactor vessel. The zero valent iron media may be at least partially coated with an iron oxide compound. The conditioning additive may comprise a soluble aluminum salt. The reaction additive may comprise a soluble aluminum salt. The method may further comprise maintaining a concentration of aluminum ions within the reactor vessel within a predetermined range by monitoring and adjusting a flowrate of the reaction additive.

In some embodiments, contacting the zero valent iron media with the conditioning additive comprises contacting the zero valent iron media with aluminum chloride. Contacting the zero valent iron media with the conditioning additive may comprise contacting the zero valent iron media with aluminum chloride and sodium nitrate. Introducing the reaction additive may comprise introducing aluminum chloride.

In some embodiments, producing the product water having a second concentration of contaminants lower than a first concentration of contaminants in the contaminated water may comprise reducing a concentration of one or more contaminants selected from the group consisting of selenium, arsenic, cadmium, chromium III, chromium VI, cobalt, copper, lead, mercury, antimony, molybdenum, nickel, titanium, tungsten, vanadium, and zinc in the contaminated water.

In some embodiments, providing zero valent iron media in the reactor vessel comprises providing zero valent iron media in one of a packed bed, a fluidized bed, and a mixed bed.

In some embodiments, introducing the contaminated water comprises introducing contaminated water originating from a source selected from the group consisting of flue-gas desulfurization waste water, petroleum refining process waste water, mining operations waste water, surface water, and ground water.

In some embodiments, the method for reducing a concentration of one or more contaminants in a contaminated water further comprises introducing an oxidizing agent into the reactor vessel and contacting the oxidizing agent with the contaminated water, the zero valent iron media, and the reaction additive.

In some embodiments, the method for reducing a concentration of one or more contaminants in a contaminated water further comprises maintaining the conditioned zero valent iron media in a fluidized state within the reactor vessel. The method for reducing a concentration of one or more contaminants in a contaminated water may further comprise maintaining anaerobic conditions within the reactor vessel.

In accordance with an aspect, there is provided a system comprising a reactor vessel including zero valent iron media disposed within the reactor vessel, a source of a conditioning additive in fluid communication with the reactor vessel, a source of contaminated water fluidly connectable to the reactor vessel, a source of a reaction additive in fluid communication with the reactor vessel, and a process control subsystem. In some embodiments, the zero valent iron media is at least partially coated with an iron oxide compound. The conditioning additive may comprise a soluble aluminum salt. The reaction additive may comprise a soluble aluminum salt. The source of a conditioning additive may be configured to introduce the conditioning additive into the reactor vessel to contact the zero valent iron media and produce a conditioned zero valent iron media. The source of contaminated water may be configured to introduce the contaminated water into the reactor vessel to contact the conditioned zero valent iron media. The source of a reaction additive may be configured to introduce the reaction additive into the reactor vessel to contact the contaminated water and conditioned zero valent iron media. The process control subsystem may be configured to maintain a concentration of aluminum ions within the reactor vessel within a predetermined range.

In some embodiments, at least one of the conditioning additive and the reaction additive may comprise aluminum chloride. The conditioning additive may comprise aluminum chloride and sodium nitrate.

In a further aspect, the invention provides a method for reducing a concentration of one or more contaminants in a contaminated water having a first concentration of contaminants. In one embodiment, the method comprises:
providing zero valent iron media, at least partially coated with an iron oxide compound, in a reactor vessel;
contacting the zero valent iron media with a conditioning additive comprising a soluble aluminum salt to produce a conditioned zero valent iron media; and
contacting the contaminated water with the conditioned zero valent iron media in the reactor vessel to produce a product water having a second concentration of contaminants lower than the first concentration of contaminants.

In still a further aspect, the invention provides a method for selectively reducing the concentration of selenate in a contaminated water having a first concentration of selenate and a first concentration of nitrate. In one embodiment, the method comprises: providing zero valent iron media, at least partially coated with an iron oxide compound, in a reactor vessel;
contacting the zero valent iron media with a conditioning additive comprising a soluble aluminum salt to produce a conditioned zero valent iron media; and
contacting the contaminated water with the conditioned zero valent iron media in the reactor vessel to produce a product water having a second concentration of selenate and a second concentration of nitrate,
wherein the second concentration of selenate is less than the first concentration of selenate,
wherein the second concentration of nitrate is less than the first concentration of nitrate, and
wherein the decrease in selenate concentration is greater than the decrease in nitrate concentration.

In certain embodiments of the above methods, contacting the zero valent iron media with the conditioning additive comprises contacting the zero valent iron media with a trivalent aluminum species.

In certain embodiments of the above methods, the soluble aluminum salt is selected from the group consisting of aluminum chloride and aluminum sulfate.

In certain embodiments of the above methods, contacting the zero valent iron media with the conditioning additive comprises contacting the zero valent iron media with a soluble aluminum salt and sodium nitrate.

In certain embodiments, the above methods further comprise introducing a reaction additive comprising a soluble aluminum salt into the reactor vessel and maintaining a concentration of aluminum ions within the reactor vessel within a predetermined range by monitoring and adjusting a flowrate of the reaction additive.

In certain embodiments of the above methods, the contaminated water further comprises one or more contaminants selected from the group consisting of arsenic, cadmium, chromium III, chromium VI, cobalt, copper, lead, mercury, antimony, molybdenum, nickel, titanium, tungsten, vanadium, and zinc.

In certain embodiments of the above methods, providing zero valent iron media in the reactor vessel comprises providing zero valent iron media in one of a packed bed, a fluidized bed, or a mixed bed.

In certain embodiments of the above methods, introducing the contaminated water comprises introducing contaminated water originating from a source selected from the group consisting of flue-gas desulfurization waste water, petroleum refining process waste water, mining operations waste water, surface water, and ground water.

In certain embodiments, the above methods further comprise maintaining the conditioned zero valent iron media in a fluidized state within the reactor vessel.

In certain embodiments of the above methods, contacting the zero valent iron media with the conditioning additive comprises contacting the zero valent iron media with about 20 mM of the soluble aluminum salt.

In certain embodiments, the above methods further comprise maintaining a concentration of aluminum ions within the reactor vessel between about 0.25 mM and about 2.0 mM.

In certain embodiments, the above methods further comprise maintaining anaerobic conditions within the reactor vessel.

DESCRIPTION OF THE DRAWINGS

The foregoing aspects and many of the attendant advantages of this invention will become more readily appreciated as the same become better understood by reference to the following detailed description, when taken in conjunction with the accompanying drawings. The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION OF THE INVENTION

Figure 1:
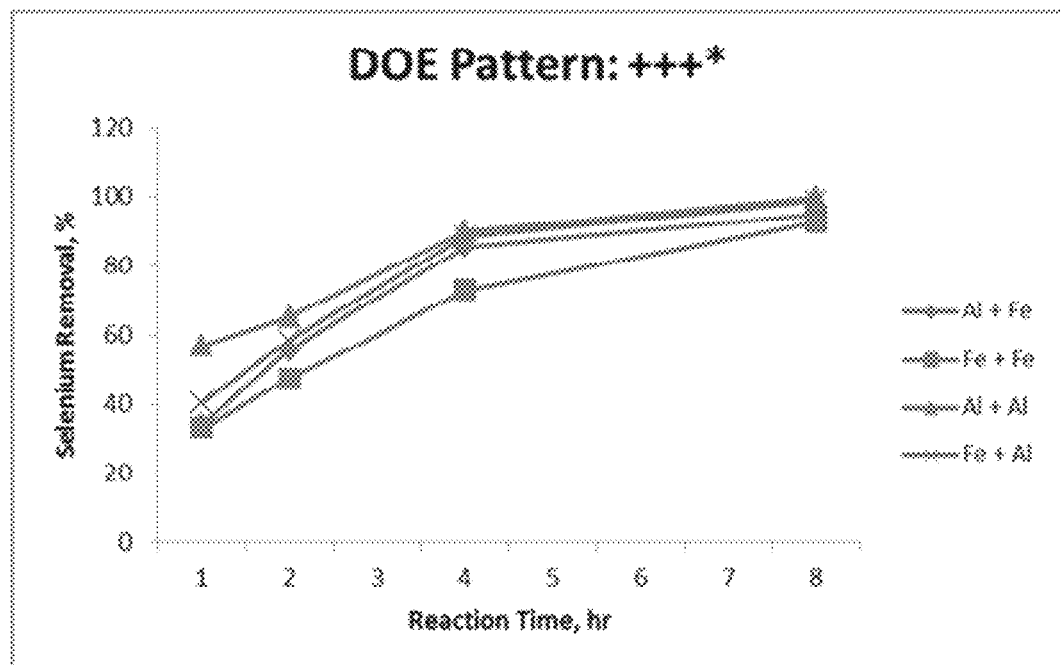
FIG. 1 is a graph of reaction time for percentage of selenium removed from simulated contaminated water, corresponding to a first set of experimental parameters.
Figure 2:
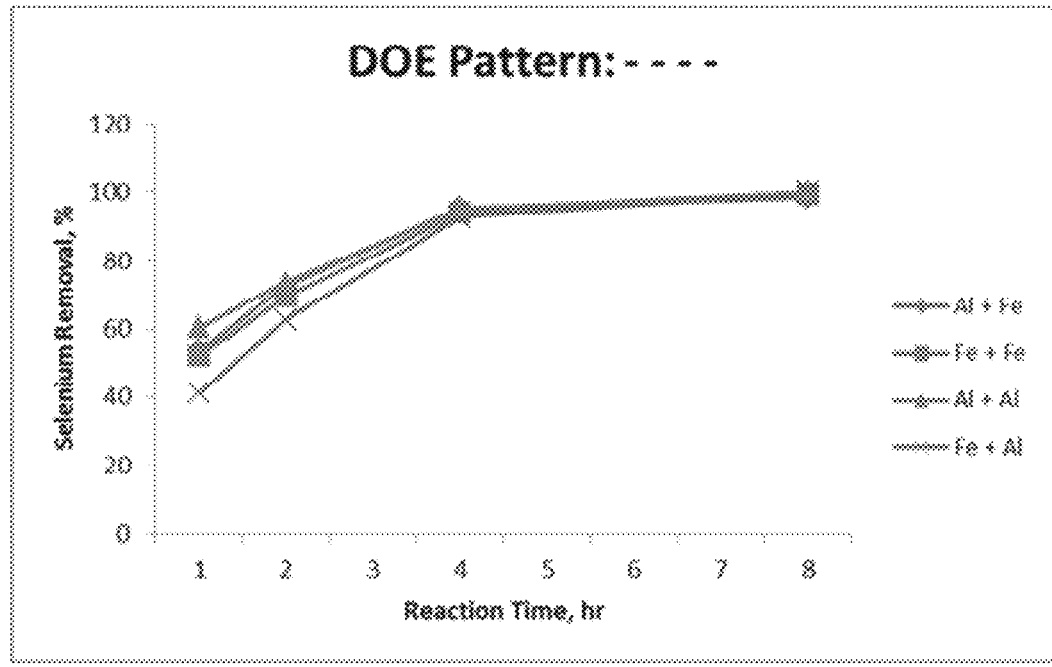
FIG. 2 is a graph of reaction time for percentage of selenium removed from simulated contaminated water, corresponding to a second set of experimental parameters.
Figure 3:
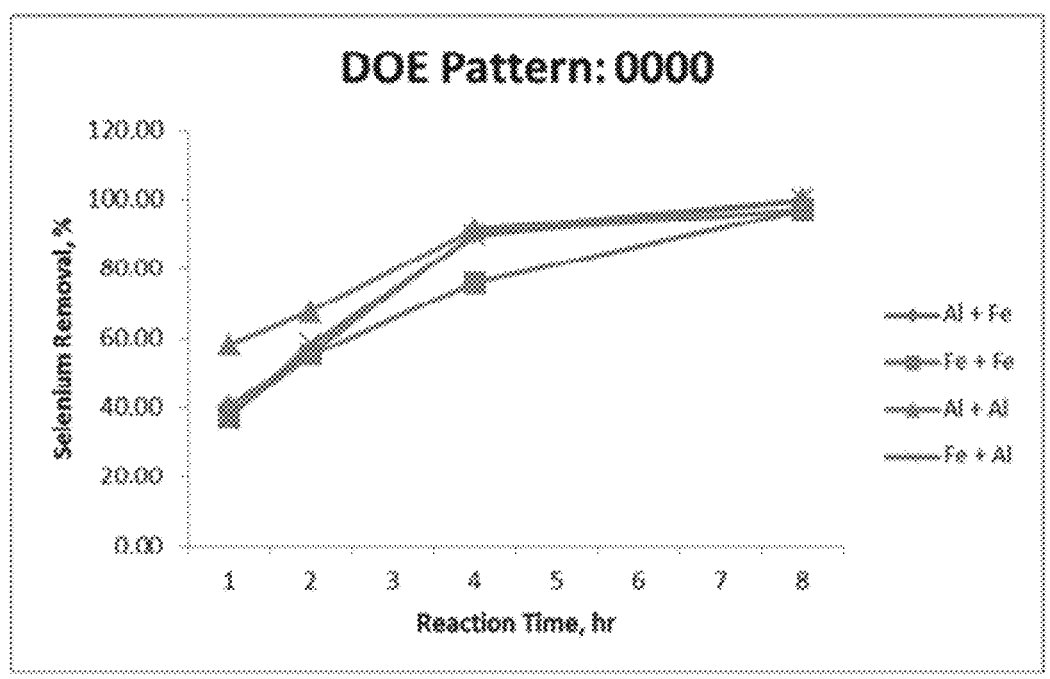
FIG. 3 is a graph of reaction time for percentage of selenium removed from simulated contaminated water, corresponding to a third set of experimental parameters.
Figure 4:
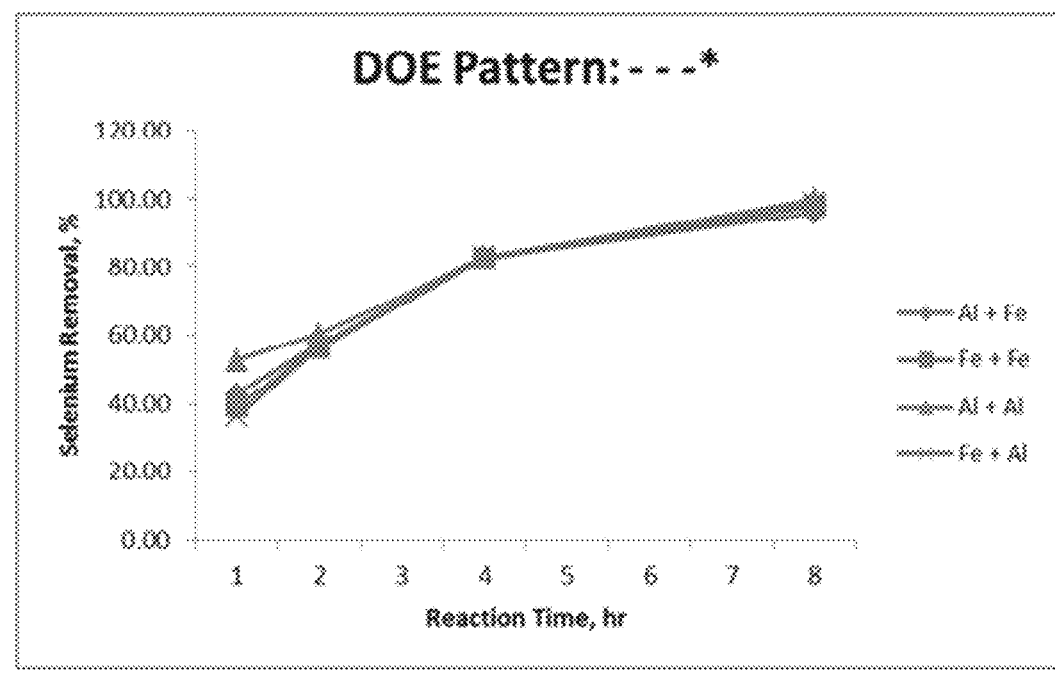
FIG. 4 is a graph of reaction time for percentage of selenium removed from simulated contaminated water, corresponding to a fourth set of experimental parameters.
Figure 5:
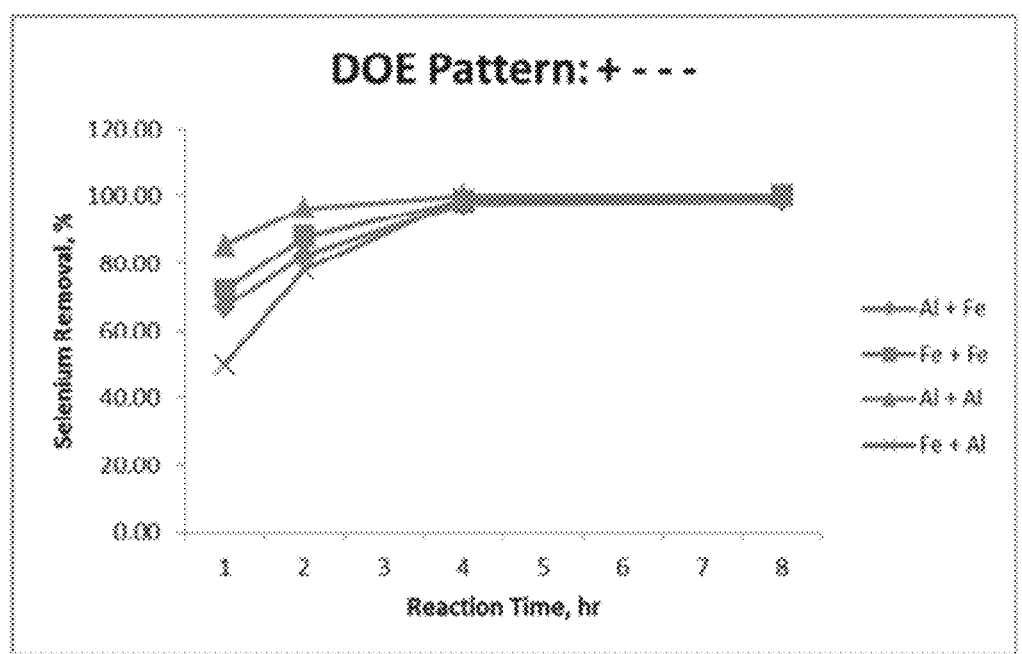
FIG. 5 is a graph of reaction time for percentage of selenium removed from simulated contaminated water, corresponding to a fifth set of experimental parameters.
Figure 6:
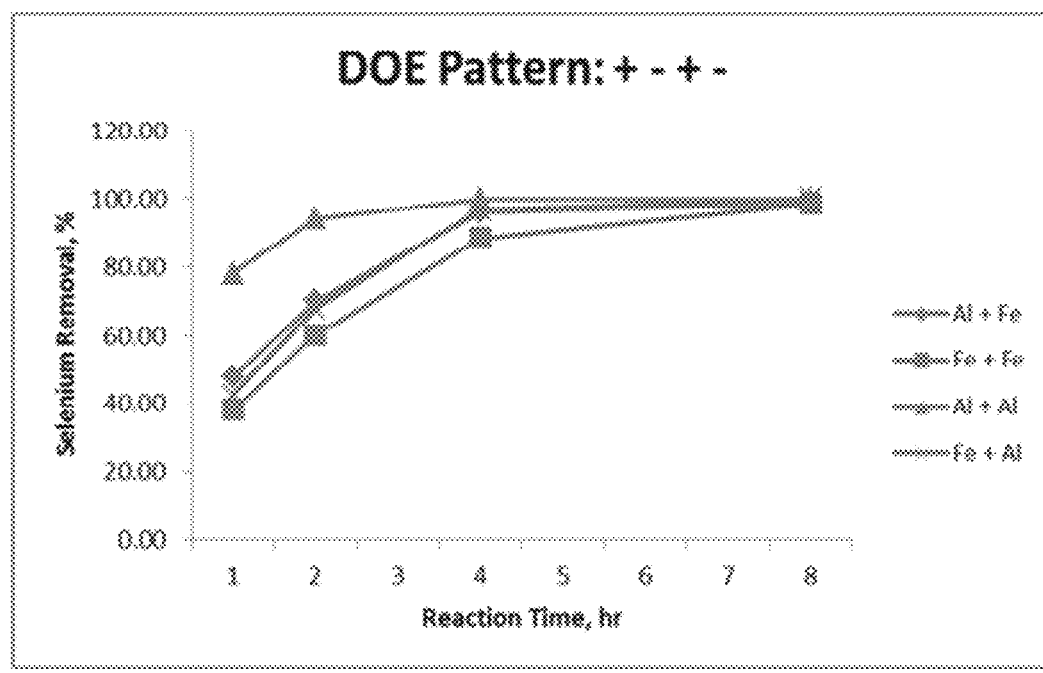
FIG. 6 is a graph of reaction time for percentage of selenium removed from simulated contaminated water, corresponding to a sixth set of experimental parameters.

Two major industrially available technologies for the removal of selenium from water are biological treatments and zero-valent iron (ZVI) technology. Biological treatment requires a large footprint and it cannot remove the reduced form of selenium, selenocyanate. Selenocyanate must first be oxidized to selenite and selenate before it may be removed by a biological treatment. ZVI technology can remove selenium in different oxidation states through redox reactions, adsorption, and co-precipitation in a reactor. However, surface corrosion of ZVI can form oxide and oxihydroxide compounds that passivate the ZVI surfaces, diminishing ZVI reactivity with respect to the target contaminants, and eventually causing the reactions to stop altogether. The lack of a viable method to overcome the ZVI surface passivation has caused attempts to develop ZVI technology into a reliable selenium removal solution to be substandard.

By introducing $Fe^{2+}$ iron into ZVI surface corrosion reactions as a mediating agent, the formation of passivating iron oxides, such as "red rust" ($Fe_2O_3$) is mitigated. Instead, $Fe^{2+}$ mediation leads to formation of magnetite ($Fe_3O_4$), a mixed Fe(II) and Fe(III) electron-conducting iron oxide that helps mediate rapid redox reactions between ZVI and contaminants. Magnetite is capable of conducting electrons from the corroding ZVI surface while avoiding the surface passivation experienced with traditional ZVI treatment.

$Fe^{2+}$ serves as a partial electron donor for selenate reduction. The mechanism by which $Fe^{2+}$ transforms the passive ferric coating into magnetite is shown below:

$$Fe_2O_3 + H_2O \leftrightarrow 2FeOOH \quad \text{(hydration)}$$

$$Fe^0 + 2H_2O \rightarrow Fe(OH)_2 + H_2\uparrow \quad \text{(anaerobic corrosion)}$$

$$Fe(OH)_2 + Ox(oxidant) \rightarrow Fe(OH)_3 + Re \quad \text{(reductant)}$$

$$2Fe(OH)_3 + Fe^{2+} \rightarrow Fe_3O_4 + 2H_2O + 2H^+$$

$$2FeOOH + Fe^{2+} \rightarrow Fe_3O_4 + 2H^+$$

Magnetite exhibits an enhanced electron transfer and thus selenate reduction.

Other metallic ions when added as accelerants or catalysts with $Fe^{2+}$ or instead of $Fe^{2+}$ may provide added benefits. Other metal ions may be more economical to use continually than $Fe^{2+}$. Additionally, at least some metal ions enhance the reactivity of magnetite towards contaminants, such as selenium, when added as accelerants or catalysts in conjunction with $Fe^{2+}$ or instead of $Fe^{2+}$. For example, one or more of $Al^{3+}$, $Mn^{2+}$, and $Co^{2+}$ when added as an accelerant, a catalyst, or both may improve performance of ZVI in contaminant removal of wastewater.

Studies have shown that $Mn^{2+}$ and $Co^{2+}$ ions are viable alternatives to $Fe^{2+}$ in catalyzing the reaction between ZVI media and metallic contaminants in wastewater. Tang et al., Chemical Engineering Journal 244 (2014) 97-104.

Aluminum salts may also be effective at catalyzing reduction reactions between heavy metals and ZVI media because of formation of aluminum oxide on ZVI surface. High concentrations of aluminum salts in the solution may stall or mitigate passivation of the ZVI media by moving the reaction products away from ZVI surface, while simultaneously facilitating oxidation processes and release of $Fe^{2+}$ into solution. Additionally, aluminum chloride ($AlCl_3$) is more cost effective and more stable than iron (II) chloride ($FeCl_2$), the source of $Fe^{2+}$ in some ZVI systems.

It was surprisingly determined that aluminum ions ($Al^{3+}$), when used as an accelerant and a catalyst in the reaction between ZVI media and contaminated water, provide improved results in wastewater contaminant removal.

In addition to selenium, a ZVI process, such as the Pironox™ (Evoqua Water Technologies LLC, Warrendale, Pa.) can be effective in removing a broad range of metals and metalloids, including antimony, arsenic, cadmium, chromium (III and VI), copper, cobalt, lead, mercury, molybdenum, nickel, titanium, tungsten, vanadium, and zinc.

In some embodiments, a system comprises a reactor vessel comprising an inlet, an outlet, and a side wall, zero valent iron media at least partially coated with one or more iron oxide compounds disposed within the reactor vessel, and a process control subsystem comprising a control module configured to maintain a predetermined concentration of metal ions in a solution within the reactor vessel.

The reactor vessel may be configured to receive a conditioning additive through the at least one inlet, and contact the zero valent iron media with the conditioning additive to produce a conditioned zero valent iron media. The reactor vessel may be configured to receive a contaminated water and a reaction additive through the at least one inlet and contact the conditioned zero valent iron media with the contaminated water and the reaction additive. The conditioning additive, reaction additive, and contaminated water may be received through the same at least one inlet or through distinct inlets. The reaction vessel may be configured to release at least some of a product water through the at least one outlet.

A product water having a lower concentration of contaminants than the concentration of contaminants in the contaminated water may be produced by a reaction between the zero valent iron media and the contaminated water. While not wishing to be bound by theory, it is believed that the zero valent iron acts as an electron generator to chemically reduce soluble metal cations and oxyanions (contaminants) to insoluble forms. During the reduction reaction, contaminants are adsorbed to the surface of the iron and are chemically incorporated into iron oxidation byproducts.

The reactor vessel may be any vessel used to contain contents described herein. The reactor vessel may comprise at least one inlet, at least one outlet, and at least one side wall. In some embodiments, the system comprises a plurality of reactor vessels disposed in series. The series of reactor vessels may be fluidly connected downstream of each other, each reactor vessel containing ZVI media.

The ZVI media may include one or more iron oxide compounds. The ZVI media may be partially coated with one or more iron oxide compounds. For example, the ZVI media may be at least partially coated with magnetite. In some embodiments, the ZVI media is in the form of particles which may include, for example, nanoparticles and/or microparticles. The ZVI media may be in the form of steel wool. In some embodiments, ZVI media is disposed in a media bed selected from the group consisting of a packed bed, a fluidized bed, and a mixed bed. The ZVI media may be disposed in a stirred tank reactor or a fixed bed reactor.

In some embodiments, the process control subsystem comprises a control module configured to maintain a predetermined concentration of metal ions in a solution within the reactor vessel. The process control subsystem may further comprise a first sensor system and a second sensor system, wherein the control module may be in electrical communication with the first and second sensor systems.

The control module may be configured to receive information from the first and second sensor systems. The control module may receive information from a sensor system regarding one or more parameters selected from the group consisting of concentration of one or more ions, flowrate, volume, pH, and temperature. In some embodiments, the first sensor system is configured to measure at least one parameter of a solution being received in the reactor vessel through the at least one inlet. In some embodiments, the first sensor system is configured to measure at least one parameter of one or more of the conditioning additive, the reaction additive, and the contaminated water. In some embodiments, the second sensor system may be configured to measure at least one parameter of the solution within the reactor vessel. The solution within the reactor vessel may comprise the conditioning additive, the reaction additive, the contaminated water, deionized water, or a combination.

The control module may be configured to maintain the predetermined concentration of aluminum ions in the solution within the reactor vessel. In some embodiments, the control module may adjust a flowrate of one of the conditioning additive and the reaction additive responsive to a result of an analysis of information received from the first and second sensor systems. The information received from the first and second sensor systems may comprise information regarding one or more of the parameters measured by the first and second sensor systems.

The first sensor system may be configured to measure a flowrate of at least one solution being received in the reactor vessel through the at least one inlet. The solution being received through the at least one inlet may be, for example, the conditioning additive, the reaction additive, the contaminated water, or deionized water. The first sensor system may be configured to measure a concentration of the conditioning additive, the reaction additive, the contaminated water, or a combination.

The second sensor system may be configured to measure a concentration of at least one of the conditioning additive, the reaction additive, the contaminated water, or a combination, within the reactor vessel.

In some embodiments, the predetermined concentration of metal ions to be maintained in the reactor vessel is between about 0.25 mM and about 2.0 mM. The predetermined concentration of metal ions may be between about 0.1 mM and 5.0 mM, between about 0.15 mM and about 3.5 mM, or between about 0.25 mM and about 2.0 mM. In some embodiments, a predetermined concentration of aluminum ions between about 0.25 mM and about 2.0 mM is maintained in the reactor vessel.

In some embodiments, the process control subsystem comprises a third sensor system in electrical communication with the control module. The third sensor system may be configured to measure at least one parameter of a solution exiting the reactor vessel through the outlet. The solution exiting the reactor vessel through the at least one outlet may comprise the product water. In some embodiments, the third sensor system is configured to measure at least one of a concentration of metal ions in the solution exiting the reactor vessel and/or a flowrate of the solution exiting the reactor vessel. For example, the third sensor system may be configured to measure a concentration of aluminum ions in the solution exiting the reactor vessel.

The control module may be configured to receive information from the third sensor system. The control module may receive information from the third sensor system regarding one or more parameters selected from the group consisting of concentration of one or more ions, flowrate, volume, pH, and temperature. In some embodiments, the control module may adjust a flowrate of at least one of the reaction additive and the conditioning additive responsive to a result of analysis of information from the third sensor system.

The conditioning additive may function as an accelerant to the reactivity of ZVI and the contaminants when contacted with ZVI media. In some embodiments, the ZVI media is virgin ZVI media that has not been conditioned. In some embodiments, the conditioning additive is added to the reactor vessel to contact the ZVI media before the contaminated water contacts the ZVI media. The conditioning additive may be received in the reactor vessel to contact the ZVI media to produce a conditioned ZVI media. As used herein with respect to ZVI media, "conditioned" refers to ZVI media that has been contacted or treated with a conditioning additive. The conditioned ZVI media may exhibit a reduced rate of surface passivation during use with the contaminated water, as compared to ZVI media that has not been conditioned.

The conditioning additive may comprise a metallic ion or a salt of a metallic ion that is capable of transforming passive ferric coating into magnetite. In some embodiments, the conditioning additive comprises one or more of $Fe^{2+}$, $Al^{3+}$, $Mn^{2+}$, $Co^{2+}$, and a soluble salt of one of these ions. Soluble salts include, but are not limited to, chloride salts, sodium salts, and sulfate salts. For example, the conditioning additive may comprise iron (II) chloride ($FeCl_2$), aluminum chloride ($AlCl_3$), manganese (II) chloride ($MnCl_2$), and/or cobalt (II) chloride ($CoCl_2$). The conditioning additive may further comprise sodium nitrate ($NaNO_3$). In some embodiments, the conditioning additive comprises aluminum chloride. In some embodiments the conditioning additive comprises aluminum chloride and sodium nitrate.

In some embodiments, the conditioning additive comprises 20 mM of a soluble metal salt. The conditioning additive may comprise between about 5 mM and 50 mM, between about 10 mM and 40 mM, or between about 15 mM and 30 mM of the soluble metal salt. The conditioning additive may comprise about 5 mM, 10 mM, 15 mM, 20 mM, 25 mM, 30 mM, 35 mM, 40 mM, 45 mM, or 50 mM of the soluble metal salt. In some embodiments, the conditioning additive comprises about 20 mM of a soluble aluminum salt.

The reaction additive may function as a catalyst to the reaction between the conditioned ZVI media and the contaminants in the contaminated water. The conditioned ZVI media may exhibit a reduced rate of surface passivation when a predetermined concentration of metal ions is maintained within the reactor during use with contaminated water. The reaction additive may be added to the reactor vessel to maintain the predetermined concentration of metal ions. For example, a reaction additive comprising soluble aluminum salt may be added to the reactor vessel to maintain a predetermined concentration of aluminum ions in the reactor vessel. In some embodiments, the reaction additive and the contaminated water are added to the vessel simultaneously. In some embodiments, the contaminated water is added to the vessel before the reaction additive. In some embodiments, the reaction additive comprises one or more of $Fe^{2+}$, $Al^{3+}$, $Mn^{2+}$, $Co^{2+}$, and a soluble salt of one of these ions. Soluble salts include, but are not limited to, chloride salts, sodium salts, and sulfate salts. For example, the reaction additive may comprise iron (II) chloride ($FeCl_2$), aluminum chloride ($AlCl_3$), manganese (II) chloride ($MnCl_2$), or cobalt (II) chloride ($CoCl_2$). In some embodiments, the reaction additive comprises aluminum chloride. In some embodiments, the predetermined concentration of metal ions to be maintained within the reactor vessel is between about 0.25 mM and between about 2.0 mM of aluminum ions.

In some embodiments, a system comprises a reactor vessel including ZVI media, a source of a conditioning additive in fluid communication with the reactor vessel, a source of a reaction additive in fluid communication with the reactor vessel, a source of contaminated water fluidly connectable to the reactor vessel, and a process control subsystem. The ZVI media may be at least partially coated with an iron oxide compound, as previously described.

The source of a conditioning additive may be configured to introduce the conditioning additive into the reactor vessel to contact the ZVI media and produce a conditioned ZVI media. The conditioning additive may be introduced into the reactor vessel through at least one inlet of the reactor vessel. In some embodiments, the conditioning additive comprises a soluble metal salt, as previously described. For example, the conditioning additive may comprise a soluble aluminum salt.

The source of a contaminated water may be configured to introduce the contaminated water into the reactor vessel to contact the conditioned zero valent iron media. The source of a contaminated water may comprise contaminated water selected from the group consisting of flue-gas desulfurization waste water, petroleum refining process waste water, mining operations waste water, surface water, and ground water.

In some embodiments, the source of contaminated water comprises contaminated water that has been pre-treated prior to fluid connection with the reactor vessel. For example, the source of contaminated water may be filtered for macroparticles or contaminants.

The source of a reaction additive may be configured to introduce the reaction additive into the reactor vessel to contact the contaminated water and conditioned ZVI media. The reaction additive may be introduced into the reactor vessel through at least one inlet of the reactor vessel. In some embodiments, the reaction additive comprises a soluble metal salt, as previously described. For example, the reaction additive may comprise a soluble aluminum salt.

The process control subsystem may be configured to maintain a concentration of metal ions within the reactor vessel within a predetermined range. For example the process control subsystem may be configured to maintain a concentration of aluminum ions within the reactor vessel within a predetermined range.

In some embodiments, a method for reducing a concentration of one or more contaminants in a contaminated water comprises providing zero valent iron media in a reactor vessel, contacting the zero valent iron media with a conditioning additive to produce a conditioned zero valent iron media, contacting the contaminated water with the conditioned zero valent iron media in the reactor vessel to produce a product water, introducing a reaction additive, and maintaining a concentration of metal ions within the reactor vessel within a predetermined range. The zero valent iron media may be at least partially coated with an iron oxide compound.

The contaminated water has a first concentration of contaminants. In some embodiments, the product water may have a second concentration of contaminants lower than the first concentration of contaminants of the contaminated water. Producing the product water having a second concentration of contaminants may comprise reducing a concentration of one or more contaminants in the contaminated water to produce the product water. In some embodiments, the one or more contaminants are selected from the group consisting of selenium, arsenic, cadmium, chromium III, chromium VI, cobalt, copper, lead, mercury, antimony, molybdenum, nickel, titanium, tungsten, vanadium, and zinc.

In some embodiments, the conditioning additive may comprise a soluble metal salt, as previously described. Contacting the ZVI media with a conditioning additive may comprise contacting the ZVI media with a soluble metal salt. For example, contacting the ZVI media with a conditioning additive may comprise contacting the ZVI media with a soluble aluminum salt. Contacting the ZVI media with a conditioning additive may comprise contacting the ZVI media with aluminum chloride. Contacting the ZVI media with a conditioning additive may comprise contacting the ZVI media with a soluble metal salt and sodium nitrate.

Contacting the ZVI media with the conditioning additive may comprise contacting ZVI media with about 20 mM of a soluble metal salt. Contacting the ZVI media with the conditioning additive may comprise contacting the ZVI media with between about 5 mM and 50 mM, between about 10 mM and 40 mM, or between about 15 mM and 30 mM of the soluble metal salt. Contacting the ZVI media with the conditioning additive may comprise contacting the ZVI media with about 5 mM, 10 mM, 15 mM, 20 mM, 25 mM, 30 mM, 35 mM, 40 mM, 45 mM, or 50 mM of the soluble metal salt. In some embodiments, contacting the ZVI media with the conditioning additive comprises contacting the ZVI media with about 20 mM of a soluble aluminum salt.

In some embodiments, the reaction additive may comprise a soluble metal salt, as previously described. Introducing the reaction additive may comprise introducing a soluble metal salt. For example, introducing the reaction additive may comprise introducing a soluble aluminum salt. Introducing the reaction additive may comprise introducing aluminum chloride.

Providing the ZVI media may comprise providing ZVI media in the form of particles which may include, for example, nanoparticles and microparticles. Providing the ZVI media may comprise providing ZVI media in the form of steel wool. In some embodiments, providing the ZVI media comprises providing ZVI media disposed in a media bed selected from the group consisting of a packed bed, a fluidized bed, and a mixed bed. Providing the ZVI media may comprise providing ZVI media disposed in a stirred tank reactor or a fixed bed reactor. In some embodiments, the method comprises maintaining the ZVI media in a fluidized state within the reactor vessel.

Introducing the contaminated water may comprise introducing contaminated water originating from a source selected from the group consisting of flue-gas desulfurization waste water, petroleum refining process waste water, mining operations waste water, surface water, and ground water. In some embodiments, the method for reducing a concentration of one or more contaminants may further comprise filtering the contaminated water before contacting the contaminated water with the conditioned ZVI media in the reactor vessel.

In some embodiments, the method for reducing a concentration of one or more contaminants further comprises introducing an oxidizing agent into the reactor vessel. The oxidizing agent may be contacted with one or more of the contaminated water, the conditioning additive, the ZVI media, the conditioned zero valent iron media, and the reaction additive In some embodiments, the method for reducing a concentration of one or more contaminants further comprises maintaining anaerobic conditions within the reactor vessel. Anaerobic conditions may be maintained, for example, by sealing the reactor vessel from the atmosphere.

Maintaining a concentration of metal ions within the reactor vessel within a predetermined range may comprise monitoring a concentration of metal ions from the reaction additive. In some embodiments, the reaction additive comprises soluble aluminum salt. In such embodiments, the method may comprise maintaining a concentration of aluminum ions within the reactor vessel within a predetermined range.

The method for reducing a concentration of one or more contaminants may further comprise maintaining a concentration of metal ions by monitoring or adjusting a flowrate of the reaction additive. For example, the flowrate of the reaction additive may be adjusted responsive to a result of analysis of information from a sensor system configured to measure a concentration of metal ions within the reactor vessel. The method may further comprise monitoring or adjusting one or more of concentration of one or more ions, flowrate, volume, pH, and temperature of the reaction additive. The method may further comprise monitoring or adjusting one or more parameter of the conditioning additive, the reaction additive, the contaminated water, and deionized water.

Figure 7:
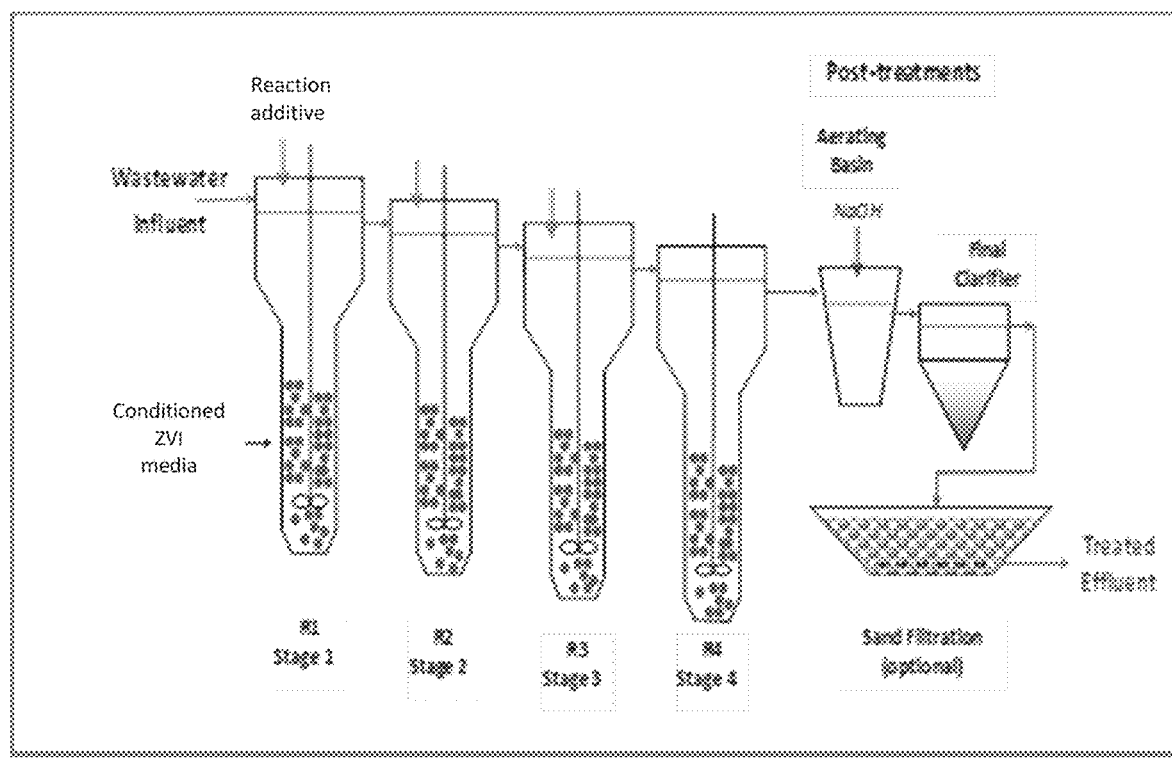
FIG. 7 is a diagram of a zero valent iron wastewater treatment system, according to one embodiment.

The method of reducing a concentration of one or more contaminants may further comprise maintaining a concentration of metal ions within the reactor vessel between about 0.25 mM and 2.0 mM. The method may comprise maintaining a concentration of one or more metal ions within the reactor vessel between about 0.1 mM and 5.0 mM, between about 0.15 mM and about 3.5 mM, or between about 0.25 mM and about 2.0 mM. In some embodiments, the method comprises maintaining a concentration of aluminum ions between about 0.25 mM and about 2.0 mM is within the reactor vessel. FIG. 7 is a diagram of a ZVI treatment system, according to one embodiment.

In the specific embodiment of FIG. 7, conditioned ZVI media is disposed in several reactor vessels arranged in series. Contaminated wastewater and a reaction additive are delivered to the reactor vessels to contact the conditioned ZVI media. A product water having a lower concentration of contaminants than the contaminated wastewater exits each reactor vessel through an outlet. The system may comprise more than one reactor vessel, disposed in series. The system may comprise less reactor vessels than illustrated in FIG. 7. For example the system may comprise a single reactor vessel, two, or three reactor vessels. The system may comprise more reactor vessels than illustrated in FIG. 7. For example, the system may comprise five or six reactor vessels.

Enhanced Metal Removal by Augmenting an Activated Iron Treatment System with Trivalent Aluminum (Al(III) or $Al^{3+}$)

Activated iron advanced media treatment systems (activated iron technology) have been demonstrated highly effective in removing a broad spectrum of dissolved heavy metals from various wastewaters, including some of the most complex and challenging industrial waste streams such as the flue-gas-desulfurization wastewater in the coal-fired electric power industry and the stripped sour water in the petroleum refinery plants. The activated iron media is prepared from zero-valent iron (ZVI) powder through a carefully controlled corrosion process with the help of externally added $Fe^{2+}$ to induce formation of magnetite ($Fe_3O_4$) as the corrosion product from the oxidation reaction of ZVI with certain oxidants such as nitrate or dissolved oxygen in the water. Activated iron media consists of three components: (1) ZVI grain (or powder) with a magnetite coating on its surface, (2) discrete magnetite crystallines, and (3) dissolved or surface-absorbed Fe(II). ZVI is the reducing agent, the source of electrons for supporting redox reaction for transforming target contaminants. The magnetite phase in the activated iron media plays a key role in mediating the chemical processes responsible for contaminant removal. Contaminants such as dissolved selenate, mercury, arsenic in contaminated water can be decreased to an extremely low concentration through several mechanisms working in tandem including surface adsorption, precipitation, reduction, and lattice substitutions, through which heavy metals are incorporated into the bulk magnetite phases and become structurally integrated into the crystalline iron oxides that are chemically stable and inert. Among various factors that affect the performance of the activated iron media, the quality of the magnetite phase is the most important one in that it largely determines the reaction kinetics.

A potential problem associated with the activated iron technology is its treatment with a wastewater with high nitrate level. The activate iron media is reactive with respect to nitrate. In the co-presence of nitrate and major metal contaminants such as selenate, laboratory and field tests showed that nitrate can be simultaneously reduced together with reduction of selenate by the activated iron media. One problem with nitrate reduction is that nitrate is reduced to ammonia. Ammonia is itself considered a contaminant, and its discharge into receiving water bodies is also regulated in many places. Moreover, in the presence of high nitrate, reduction of nitrate can consume large amount of ZVI media, thereby significantly shortening the lifespan of the media and resulting in the excessive production of spent media in form of waste sludge. This can greatly increase the operation cost of the treatment process. Moreover, in the presence of high nitrate, nitrate can compete with the main target metal contaminants, such as selenate, in acquiring the available electrons released from ZVI source to the reactive sites, thus potentially slowing down the reaction for metal contaminant removal and resulting in the requirement of prolonged reaction time.

One solution for the application of high nitrate wastewater is to pretreat the wastewater with a biological denitrification process to remove nitrate. This has been demonstrated to be a viable process in laboratory test. However, the addition of a biological unit increases the complexity as well as the overall cost of the treatment system. Another solution would be to achieve preferential treatment of target heavy metals over nitrate (i.e., the activated iron media would react with and remove the main target heavy metal contaminants such as selenate and chromate, but leave nitrate in the wastewater). Such preferential treatment of heavy metal oxyanion over nitrate is possible.

The present invention provides for the introduction of certain impurities into the iron oxide phase of the activated iron media that alters the system's reactivity. As described herein, the effect of externally added trivalent aluminum (i.e., Al(III) or $Al^{3+}$) was evaluated in the activated iron media on the media reactivity with respect to nitrate vs. selenate. The present method demonstrates that Al(III) is incorporated into the structure of iron oxides. The present method demonstrates that by introducing Al(III) into the iron oxide phase faster reaction kinetics for target contaminant removal are achieved and thus shorter reaction time needed for achieving deep reduction of target contaminants, thereby reducing the size of the treatment system and the associated capital and operational costs; and preferential removal of metal contaminants over nitrate is achieved when treating wastewater with high nitrate level.

Batch tests with controlled conditions were carried out to evaluate how the media reactivity changes with the augment of Al(III) into the media system. Results to screen through factor(s) responsible for such changes were compared. Material characterization tools were employed to elucidate the underlying mechanisms.

Materials and Methods

ZVI sources: 20 mesh ZVI grains, largely fresh surface with no obvious surface rust.

Magnetite-coated ZVI: ZVI grains were preprocessed by the $Fe^{2+}$-nitrate activation process that is used by this group to convert a raw ZVI media into the activated iron media process. Upon the complete conversion reaction, the raw ZVI grains are coated with a magnetite coating. The modified media was harvested from the reactor, drained, and rinsed with DI water in the oxygen-free environment of an anaerobic chamber (95% $N_2$+5% $H_2$ and with a catalyst device for removing any residual $O_2$). The magnetite-coated media was then dried and stored in the anaerobic chamber until used.

Al(III) source: $Al_2(SO_4)_3$ salt is used to prepare stock solutions and used in batch tests with $Al^{3+}$ addition.

Nitrate, selenate, and $Fe^{2+}$ stock solutions were prepared from $NaNO_3$, $Na_2SeO_4$, and $FeCl_2.4H_2O$ salts.

10 mL serum vials were used as the reactor to conduct batch tests. The reactors were prepared in the anaerobic chamber using oxygen-free stock solution or deionized (DI) water. In an exemplary test, 0.5 g of ZVI or magnetite-coated ZVI grains were added into the reactor, stock solution of nitrate and $Al^{3+}$ were added into the reactor, and if necessary, DI water was used to fill the reactor with 10 mL total liquid volume, with about 1.5 mL headspace in the reactor. The reactor was then capped and sealed in the anaerobic chamber. Thus, the headspace is free of oxygen. For a batch test, typically a dozen of the reactors were prepared under the same conditions in each run. These reactors were then put into a rotating tumbler (30 rpm) to provide a strong mixing condition under dark. One reactor was withdrawn and sacrificed for measuring pH and preparing liquid or solid samples for wet chemistry analysis or material characterization. For wet chemistry, the liquid suspension was filtered through 0.45 um filter membrane and the filtrate was used to analyze for nitrate, selenate, selenite, total selenium, dissolved $Fe^{2+}$, total Fe, ammonia, and dissolved aluminum.

Wet Chemistry Analytical Methods: Dissolved ions such as nitrate, selenate, selenite, and ammonia were analyzed using the Ion Chromatography method with Dionex DX500, which generally reported a detection limit of about 0.05 mg/L for these chemicals. Dissolved $Fe^{2+}$ and total Fe were analyzed using the standard colorimetric method, which reported a detection limit of 0.1 mg/L. Total selenium was analyzed using a Hydride-Generation Atomic Absorption Spectroscopy, which reported a detection limit of 1 ug/L.

Material Characterization: ZVI grains with iron oxides or iron oxides along were characterized with field emission scanning electron microscopy (FE-SEM), X-ray powder diffraction (XRD), and X-ray photoelectron spectroscopy (XPS) analyses to identify composition and crystal structure of iron oxides and characterize the morphological features of the solid samples and to determine the fate and status of impurities such as selenium and aluminum in the spent media.

Experimental Design

Six groups of batch tests were conducted to evaluate the impact of adding Al(III) in substitution of $Fe^{2+}$ on the overall reactivity of the media treatment system. In the first three tests, raw ZVI powder without the presence of pre-existing magnetite coating was used. In the following three tests, magnetite-coated ZVI powder was used. The two group tests were designed to elucidate the role of magnetite coating in achieving higher reactivity for the media, in particular for selenate reduction.

Group I—ZVI powder without pre-existing magnetite coating:
(1) ZVI+Al(III) system for treating nitrate alone;
(2) ZVI+Al(III) system for treating selenate alone; and
(3) ZVI+Al(III) system for treating nitrate and selenate in co-presence.

Group II—ZVI powder with pre-existing magnetite coating:
(4) magnetite-coated ZVI+Al(III) for treating nitrate alone;
(5) magnetite-coated ZVI+Al(III) for treating selenate alone; and
(6) magnetite-coated ZVI+Al(III) for treating nitrate and selenate in co-presence.

The results are described below and illustrated in FIGS. 8-21.

Results for Group I: ZVI+Al(III)

The results demonstrate that adding Al(III) into a ZVI system (Group I: ZVI+Al(III)) is very effective for nitrate reduction, but not so effective for supporting selenate reduction. For nitrate reduction, it appears that the intrinsic acidity with the $Al^{3+}$ solution may play a key role in achieving rapid nitrate reduction. The product from the iron corrosion, however, is $Fe_2O_3$, which is different from magnetite generated in a ZVI+$Fe^{2+}$ system in the presence of nitrate. When treating selenate alone, the ZVI+Al(III) is not quite as effective; only about 4 mg/L selenate-Se out of the added 10 mg/L was removed after 12 hour reaction even with the large dose of 6 mM Al(III), and not improved as expected even when the added Al(III) acidity caused significant release of $Fe^{2+}$ in the reaction system. The interaction between the ZVI fresh surface and Al(III) appeared to result in interfacial conditions not conducive for supporting selenate reduction. When treating a simulated wastewater with the co-presence of nitrate and selenate, no rapid nitrate reduction occurred, indicating that the presence of selenate could interfere with nitrate reduction. The presence of nitrate, however, appeared to benefit selenate reduction to a low degree. With large doses of 6.0 mM Al(III), both nitrate and selenate were gradually reduced over time toward completed reduction, but the overall reaction rate is not impressive compared with a conventional ZVI+$Fe^{2+}$ system. Overall, in the absence of magnetite coating, the ZVI+Al(III) system is not highly reactive and appears susceptible to various factor, which differs from the more robust reactivity observed in a normal activated iron media treatment system.

The solid phase characterization indicates that selenate immobilized from the aqueous phase was reduced to selenite and elemental selenium and selenide initially (1 hr reaction), and over time, selenium species in the solid phase appeared to remain with all three states in co-presence even after 12 hr reaction. The presence of significant fraction of selenite after 12 hr reaction suggested that further reduction of selenium toward selenide could not proceed with the presence of Al(III) in the system. This is clearly different from the fate of selenium immobilized in the normal ZVI+$Fe^{2+}$ system, in which selenium in the solid phase was found to exist predominantly in selenide form and no selenite was present in any significant amount. The presence of these selenium in the oxide phase may be responsible for the slow nitrate reduction in the ZVI+Al(III) system.

The results for representative ZVI/Al(III) systems are described below.

Figure 8A:
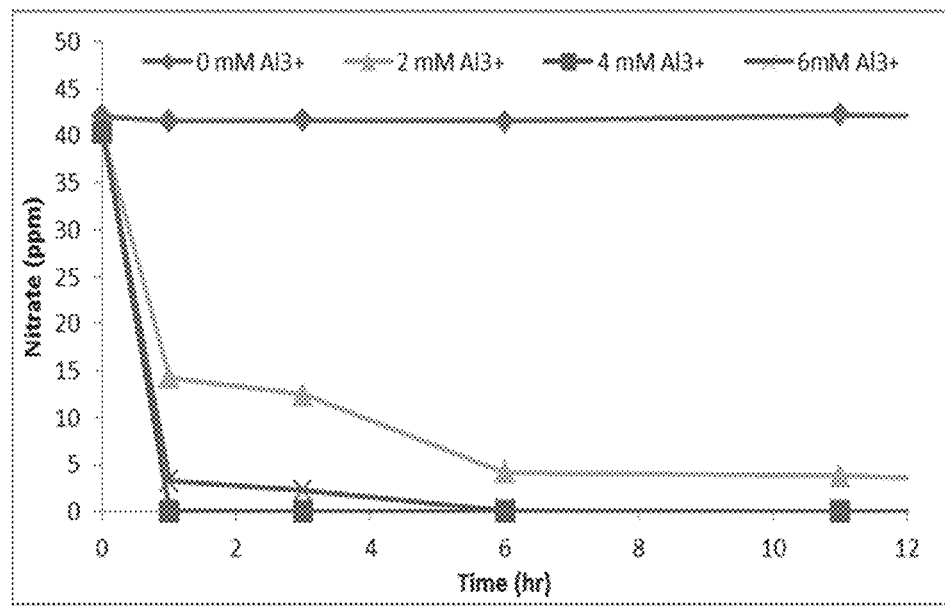
FIGS. 8A-8D compare nitrate reduction (3 mM) by ZVI grains (5% w/v) in a ZVI/Al(III) representative system over time (0, 1, 3, 6, 11 h) with various concentrations of trivalent aluminum (0, 2, 4, 6 mM): nitrate reduction (8A); ferrous iron concentration (8B); pH change (8C); and trivalent aluminum concentration (8D). Rapid nitrate reduction is observed in the representative ZVI/Al(III) system.
Figure 8B:
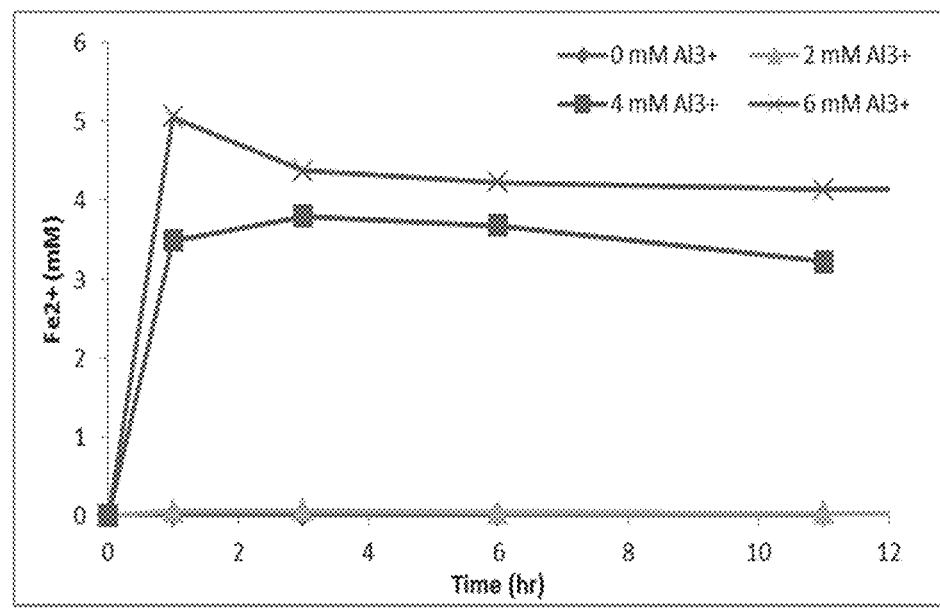
Figure 8C:
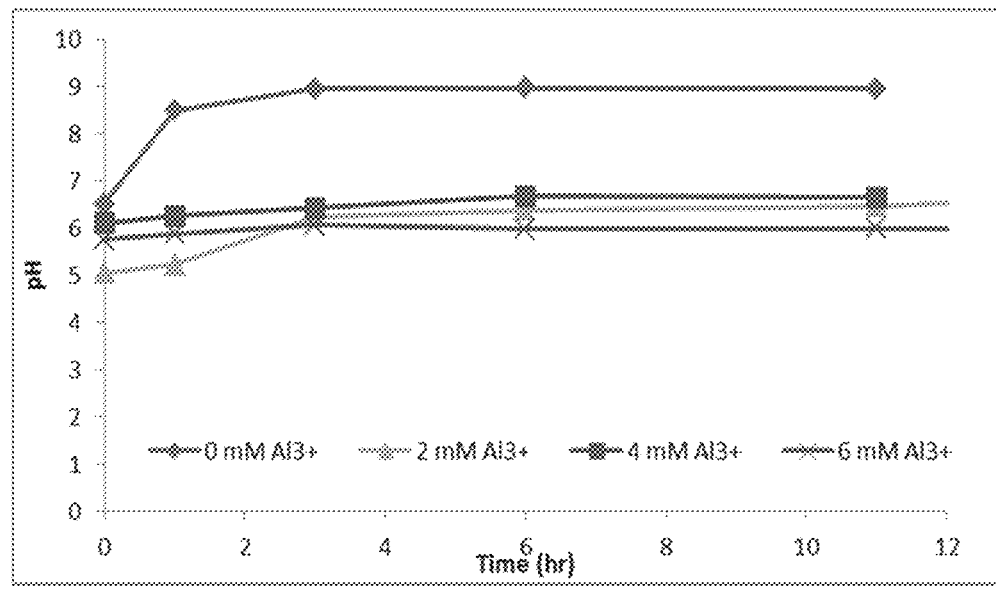
Figure 8D:
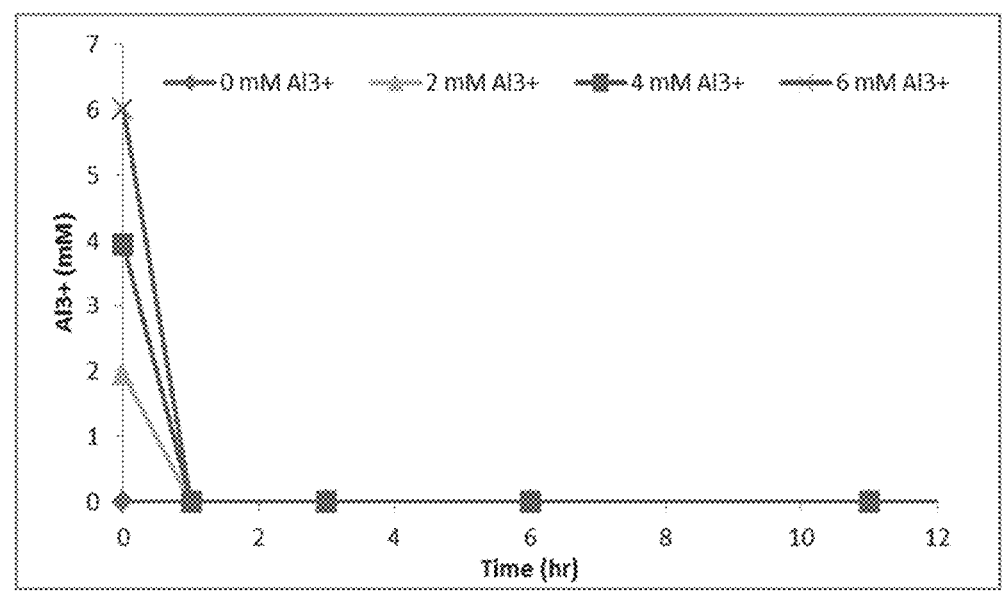

FIGS. 8A-8D compare nitrate reduction (3 mM) by ZVI grains (5% w/v) in a ZVI/Al(III) representative system over time (0, 1, 3, 6, 11 h) with various concentrations of trivalent aluminum (0, 2, 4, 6 mM): nitrate reduction (8A); ferrous iron concentration (8B); pH change (8C); and trivalent aluminum concentration (8D). Rapid nitrate reduction is observed in the representative ZVI/Al(III) system. FIG. 8A shows rapid nitrate reduction and FIG. 8D shows a corresponding rapid reduction in trivalent aluminum concentration in the liquid of the reaction system.

Figure 9:
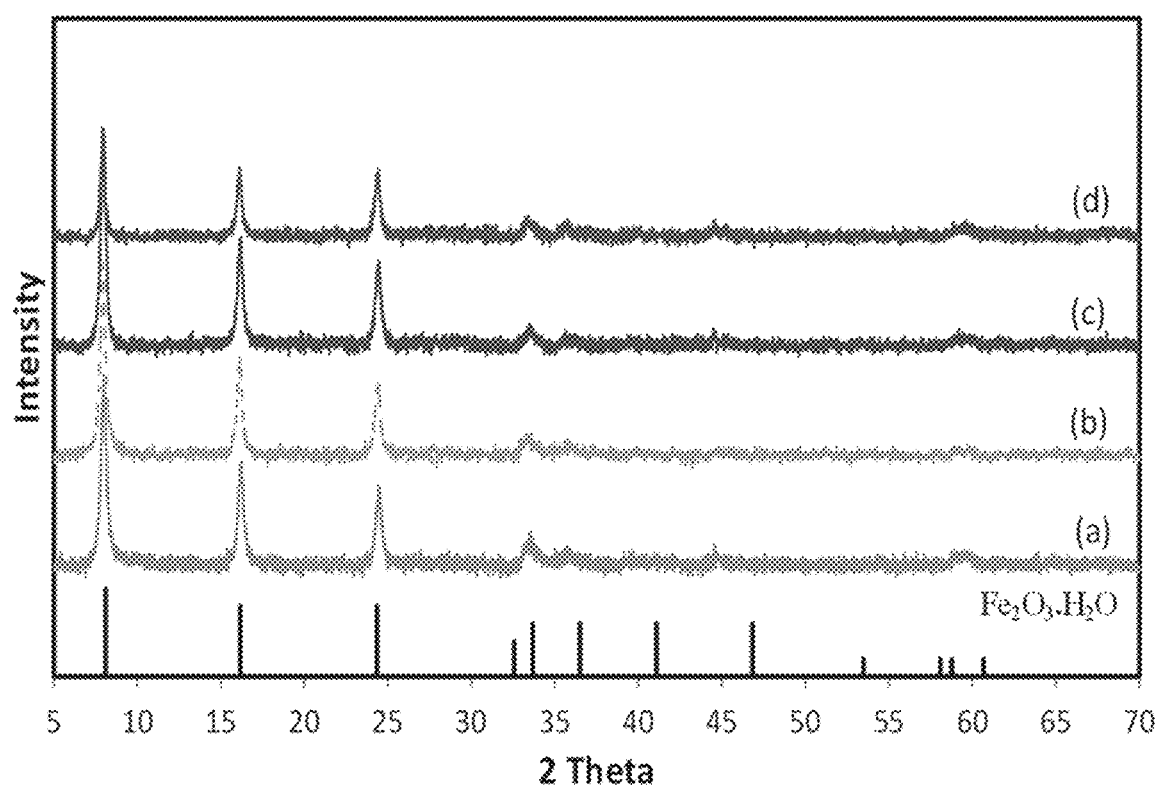
FIG. 9 compares XRD powder patterns for nitrate removal by ZVI with 6 mM trivalent aluminum as a function of reaction time (a) 1 h, (b) 3 h, (c) 6 h, and (d) 12 h. The solid suspension phase (FeAlOx) appears to match that of $Fe_2O_3$ in structure.
Figure 10A:
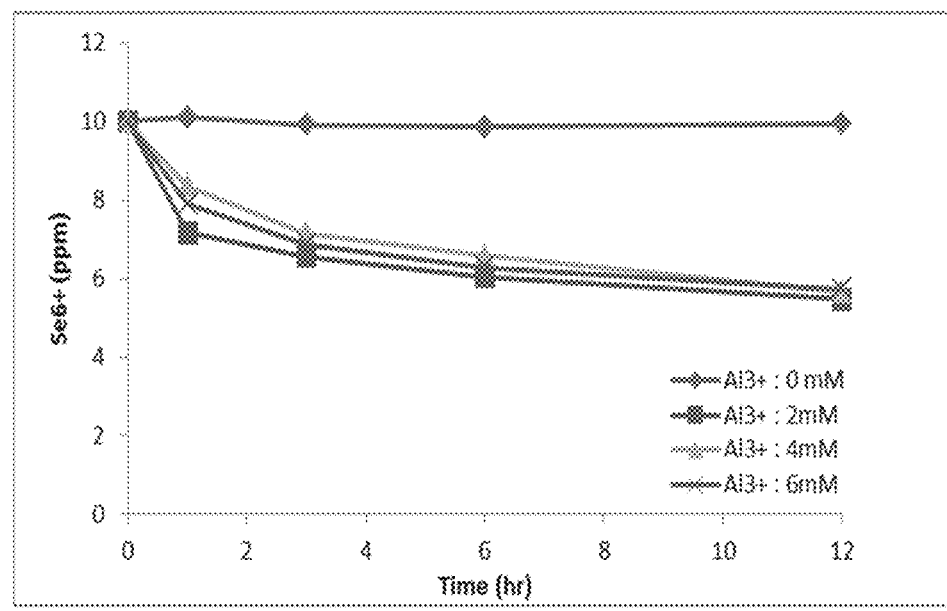
FIGS. 10A-10D compare removal of selenate (10 mg/L) with $Al^{3+}$ in a representative ZVI/Al(III) system with initial 5% w/v iron and 0, 2, 4, and 6 mM $Al^{3+}$ over time (0, 1, 3, 6, 12 h): selenate removal (10A); ferrous iron concentration (10B); pH (10C); and trivalent aluminum concentration (10D). Slow selenate reduction is observed in the representative ZVI/Al(III) system.
Figure 10B:
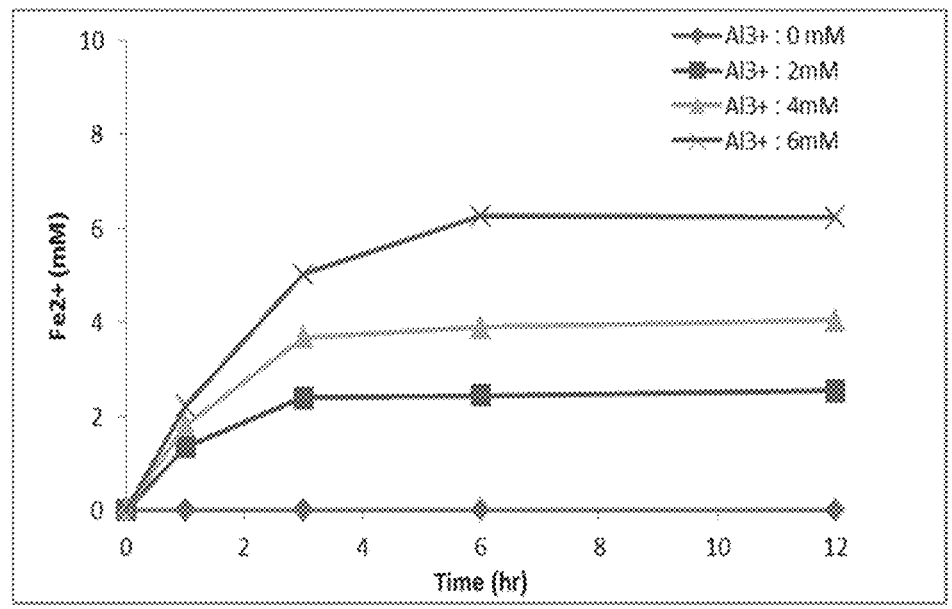
Figure 10C:
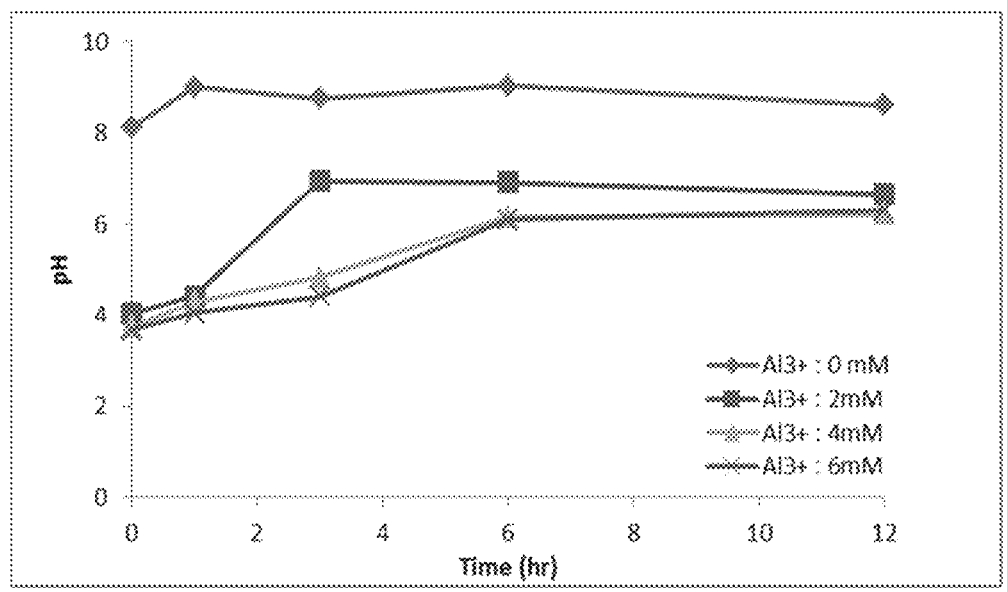
Figure 10D:
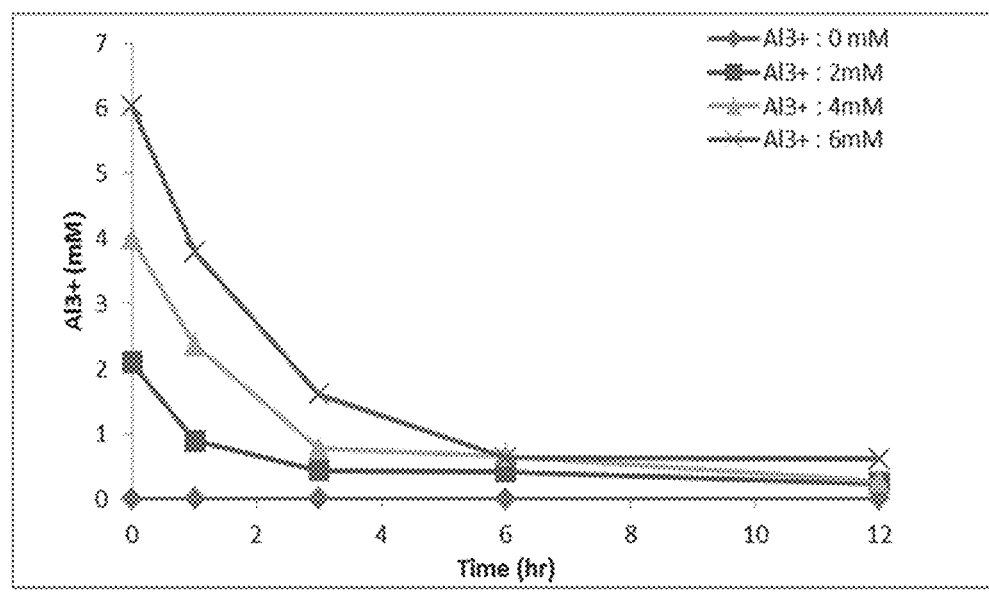
Figure 11A:
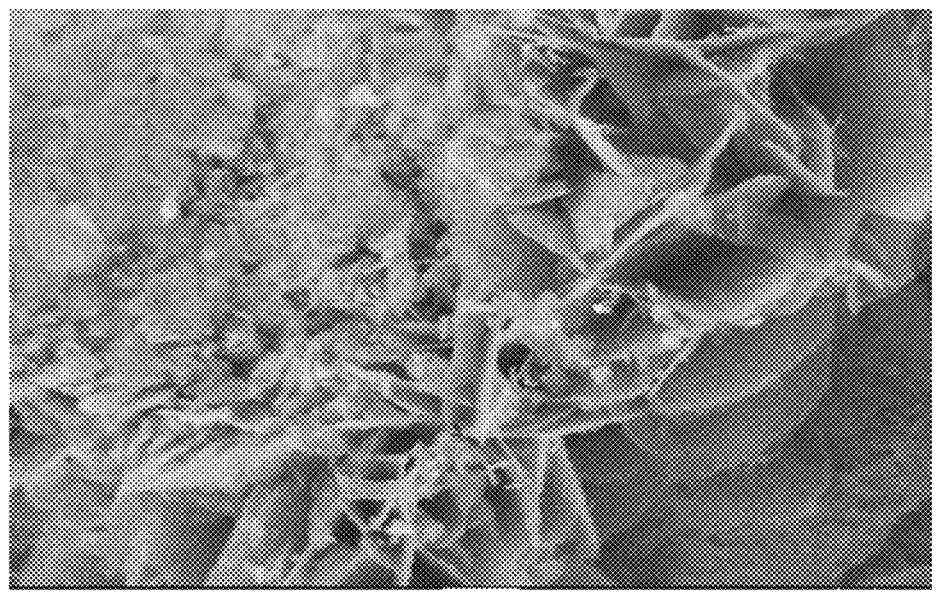
FIGS. 11A-11D are scanning electron microscope (SEM) micrographs (10,000×) of reactive media treating selenate (10 mg/L) with 6 mM $Al^{3+}$ in a 5% w/v representative ZVI/Al(III) system: 1 h (11A), 3 h (11B), 6 h (11C) and 12 h (11D).
Figure 11B:
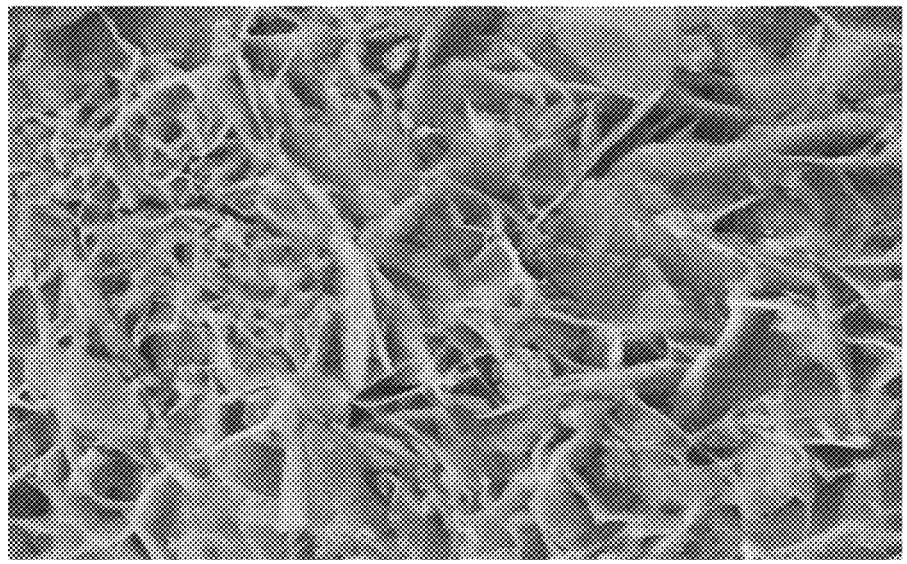
Figure 11C:
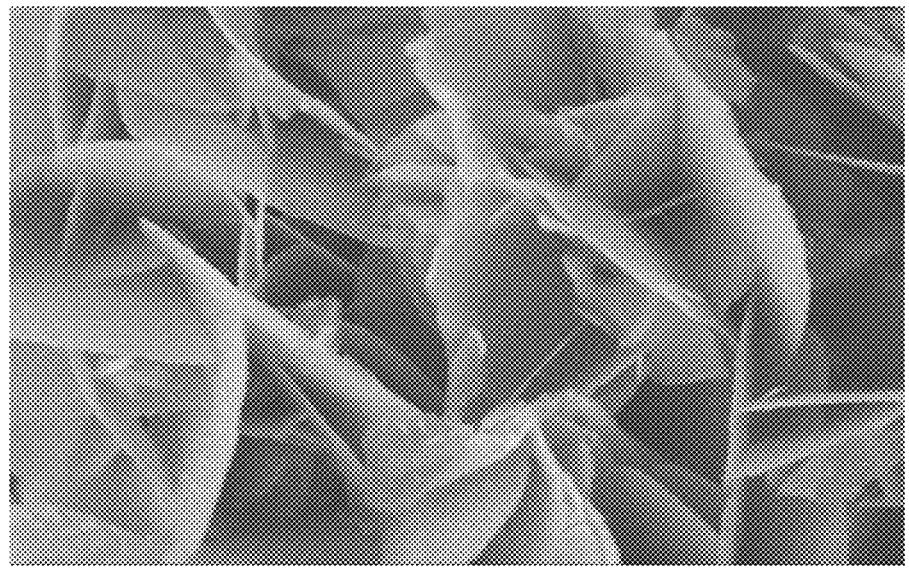
Figure 11D:
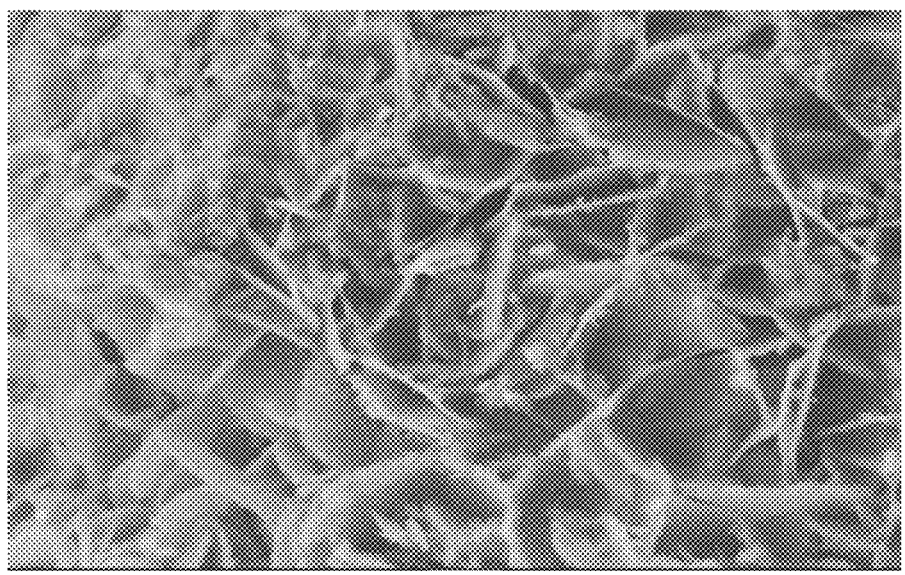

FIG. 9 compares XRD powder patterns for nitrate removal by ZVI with 6 mM trivalent aluminum as a function of reaction time (a) 1 h, (b) 3 h, (c) 6 h, and (d) 12 h. The solid suspension phase (FeAlOx) appears to match that of $Fe_2O_3$ in structure. FIGS. 10A-10D compare removal of selenate (10 mg/L) with $Al^{3+}$ in a representative ZVI/Al(III) system with initial 5% w/v iron and 0, 2, 4, and 6 mM $Al^{3+}$ over time (0, 1, 3, 6, 12 h): selenate removal (10A); ferrous iron concentration (10B); pH (10C); and trivalent aluminum concentration (10D). Slow selenate reduction is observed in the representative ZVI/Al(III) system. FIG. 10A shows slow selenate reduction and FIG. 10D shows a reduction in trivalent aluminum concentration in the liquid of the reaction system.

FIGS. 11A-11D are scanning electron microscope (SEM) micrographs (10,000×) of reactive media treating selenate (10 mg/L) with 6 mM $Al^{3+}$ in a 5% w/v representative ZVI/Al(III) system: 1 h (11A), 3 h (11B), 6 h (11C) and 12 h (11D).

Figure 12:
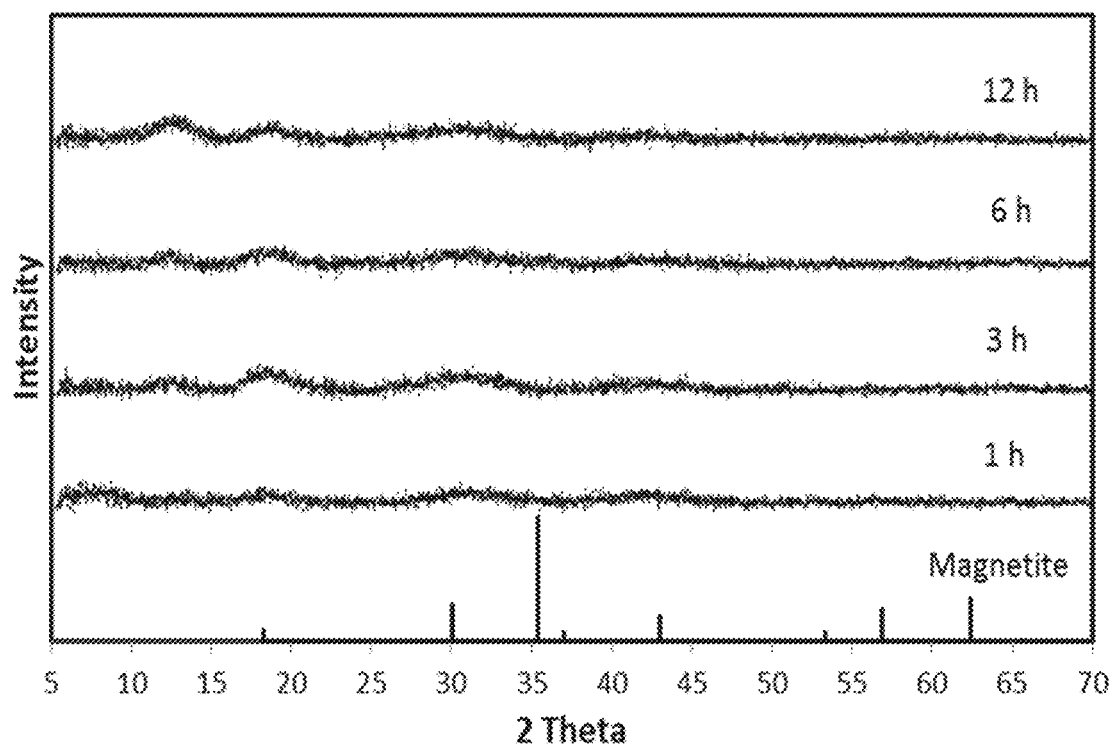
FIG. 12 compares XRD powder patterns for selenate removal by ZVI with 6 mM trivalent aluminum as a function of reaction time: 1, 3, 6, and 12 h. No crystalline form was detected in the sample.
Figure 13A:
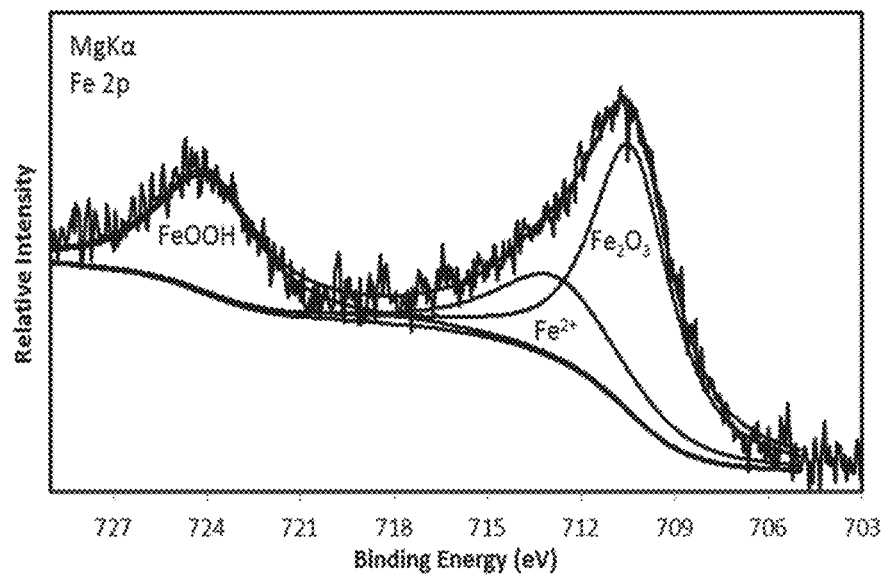
FIG. 13A-13D compare XPS spectra of iron oxides and selenium species on the reactive media: iron oxide species on reactive media after 1 h (13A); iron oxide species on reactive media after 12 h (13B); selenium species on reactive media after 1 h (13C); and selenium species on reactive media after 12 h (13D).
Figure 13B:
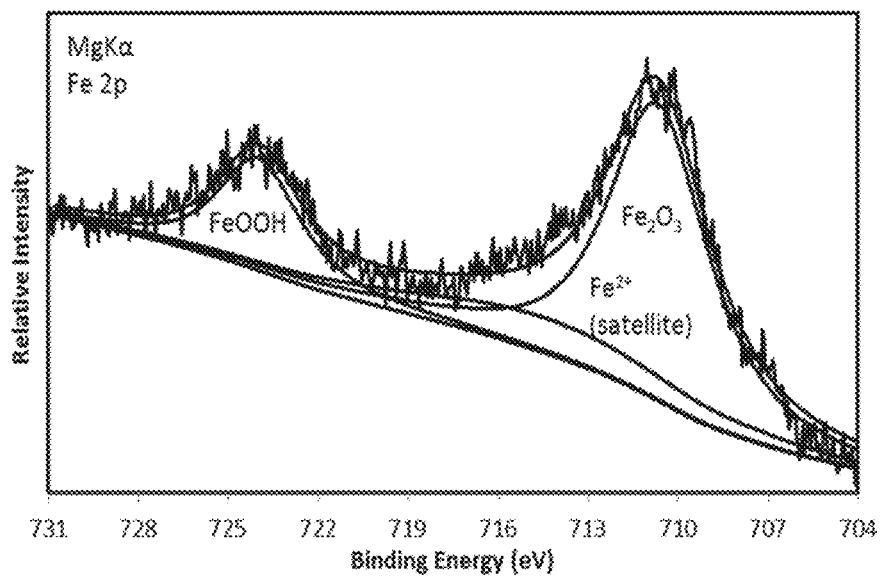
Figure 13C:
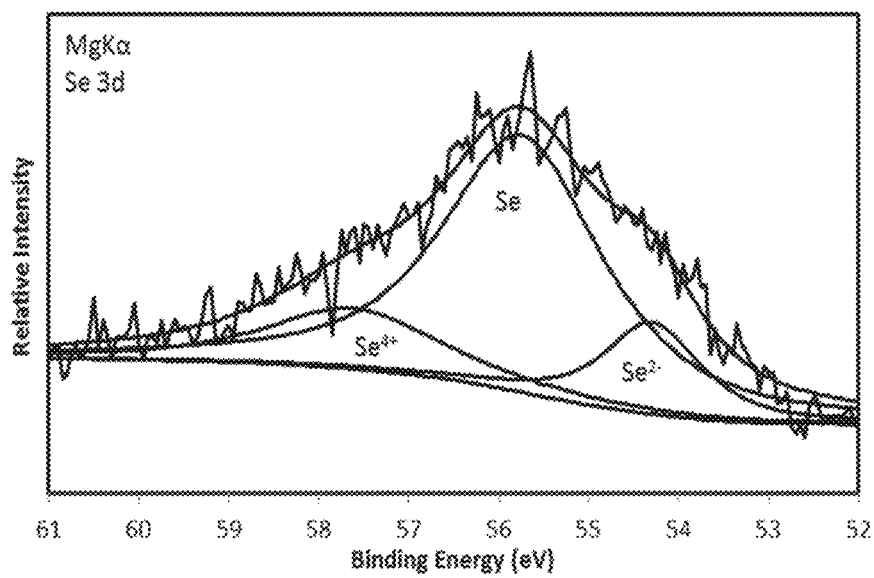
Figure 13D:
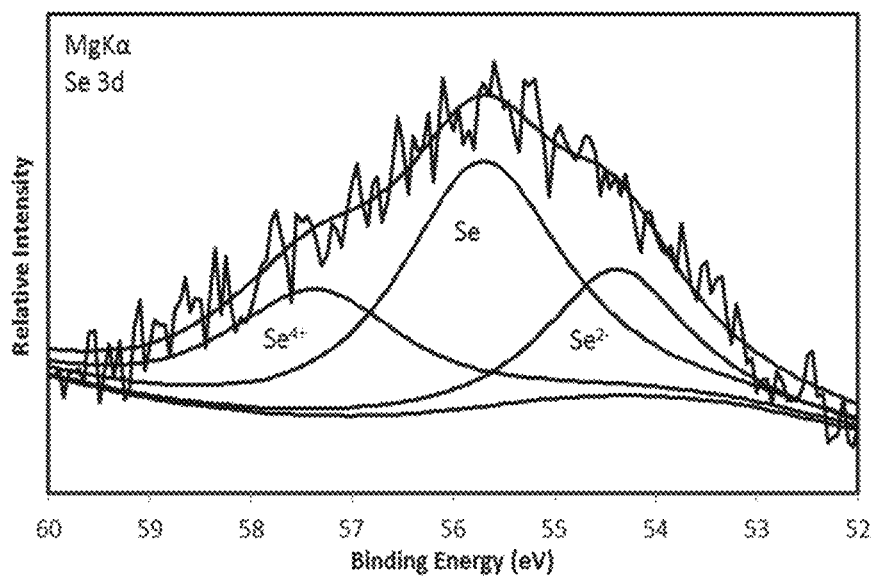

FIG. 12 compares XRD powder patterns for selenate removal by ZVI with 6 mM trivalent aluminum as a function of reaction time: 1, 3, 6, and 12 h. No crystalline form was detected in the sample.

FIG. 13A-13D compare XPS spectra of iron oxide species and selenium species on the reactive media: iron oxide species on reactive media after 1 h (13A); iron oxide species on reactive media after 12 h (13B); selenium species on reactive media after 1 h (13C); and selenium species on reactive media after 12 h (13D). The form of selenium species on the surface of ZVI at 1 h and 12 h reaction times is summarized in Table 1.

TABLE 1

Selenium species on the surface of ZVI media.

| Reaction time | Selenium form | | |
| --- | --- | --- | --- |
| | $Se^{4+}$ | $Se^0$ | $Se^{2-}$ |
| 1 h | 19.1 | 64.9 | 16.0 |
| 12 h | 29.4 | 49.5 | 21.1 |

Figure 14A:
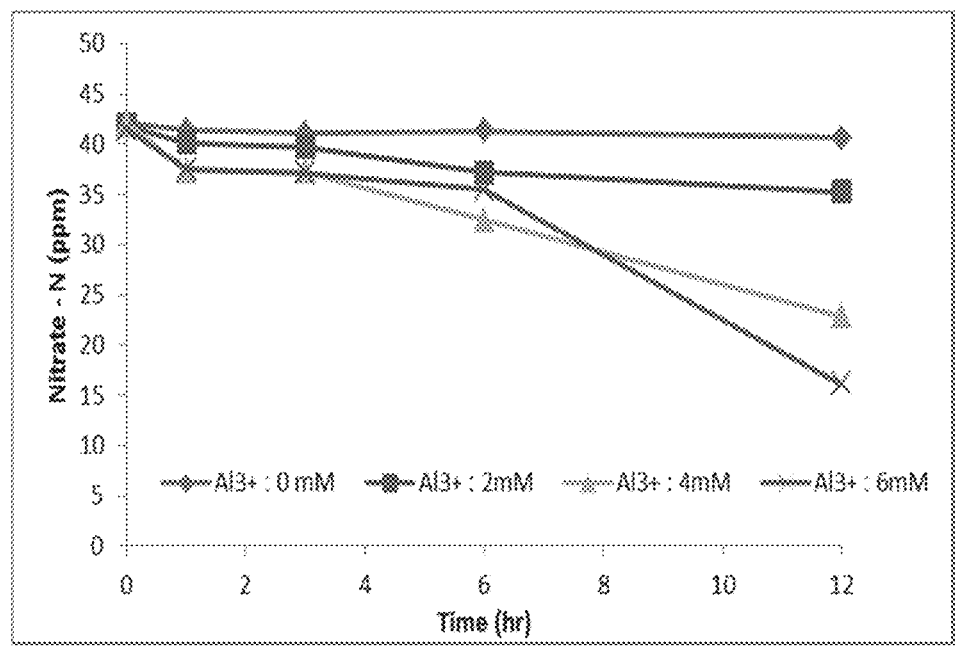
FIG. 14A-14D compare nitrate reduction and selenate removal in a representative ZVI/Al(III) system over time (0, 1, 3, 6, 12 h) with the various concentrations of trivalent aluminum (0, 2, 4, 6 mM): nitrate reduction (14A); selenate removal (14B); ferrous iron concentration (14C); and trivalent aluminum concentration (14D). In this system, selenium reduction was promoted and nitrate reduction was suppressed.
Figure 14B:
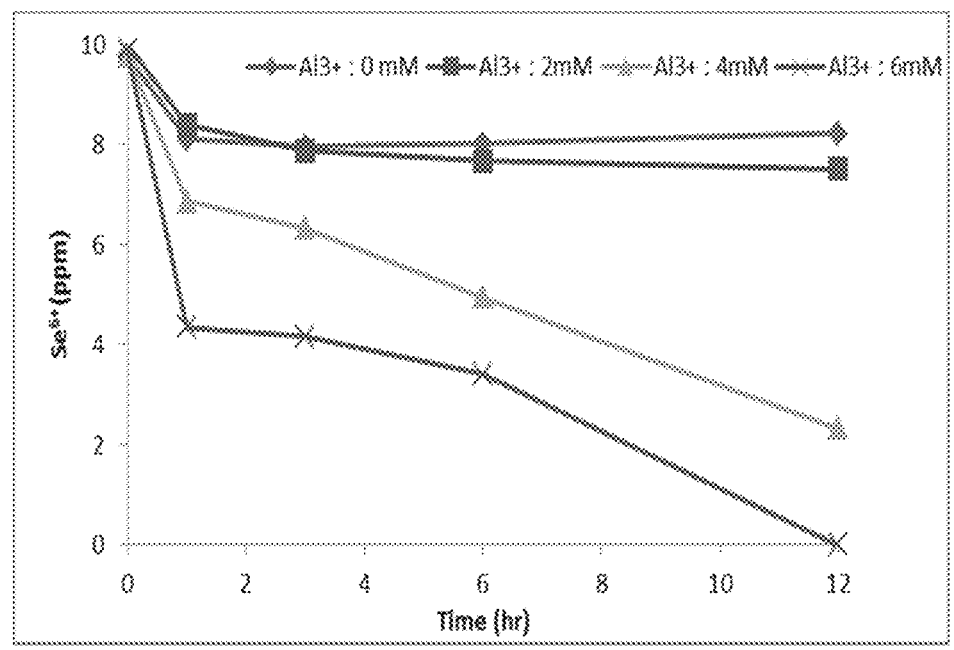
Figure 14C:
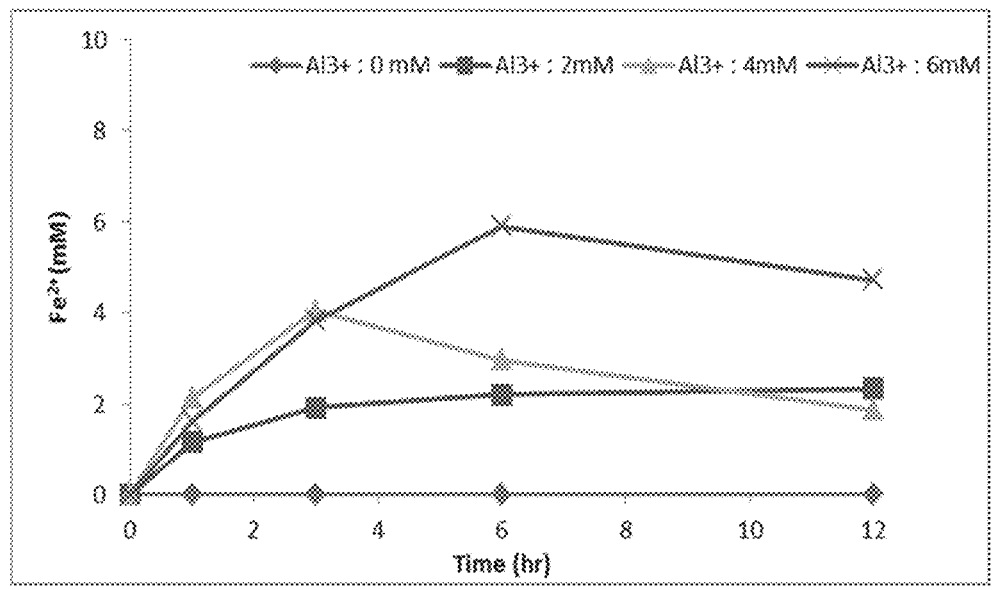
Figure 14D:
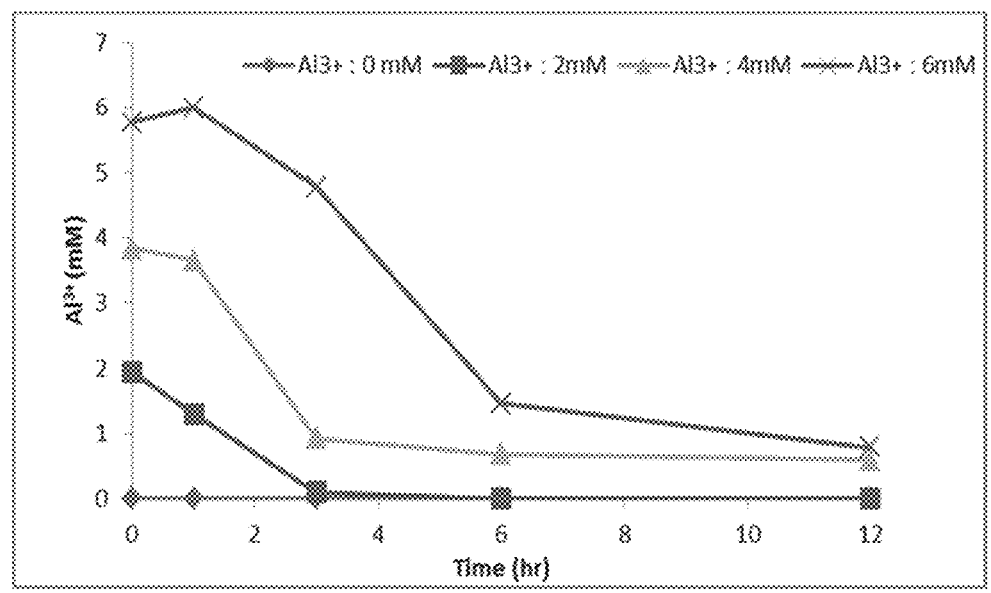

FIG. 14A-14D compare nitrate reduction and selenate removal in a representative ZVI/Al(III) system over time (0, 1, 3, 6, 12 h) with the various concentrations of trivalent aluminum (0, 2, 4, 6 mM): nitrate reduction (14A); selenate removal (14B); ferrous iron concentration (14C); and trivalent aluminum concentration (14D). In this system, selenium reduction was promoted and nitrate reduction was suppressed. FIG. 14A shows nitrate reduction suppressed in the presence of selenate compared to nitrate reduction in absence of selenate as shown in FIG. 8A. FIG. 14B shows enhanced selenate reduction in the co-presence nitrate and selenate condition compared to selenate reduction in absence of nitrate as shown in FIG. 10A.

Results for Group II: Magnetite-Coated ZVI+Al(III)

When magnetite-coated ZVI media is used (Group II: magnetite-coated ZVI+Al(III)), the result is quite different from that of ZVI+Al(III) without coating (Group I). The pre-existing coating appears to interact with the added Al(III) and the associated acidity. When treating nitrate alone, the pre-existing coating appeared to greatly slow down nitrate reduction. In the presence of the pre-existing coating, ZVI appears not to directly contact nitrate, which under an acidic condition with Al(III) (pH=about 3.9 initially), nitrate can be rapidly reduced, which is consistent with previous literature reports. The presence of the pre-existing coating, however, greatly accelerated selenate reduction. In all three tests with 2.0, 4.0, and 6.0 mM Al(III) addition, selenate was found to decrease from 10 mg/L as Se to non-detected within as short as 1 hr. All Al(III) disappeared, accompanied by the release of significant amount of dissolved $Fe^{2+}$ into the system. Both XRD and XPS characterization showed that the oxide phase is still present mainly in form of magnetite crystalline, with both Fe(II) and Fe(III) present in the oxide structure. XPS scan on Se 3d orbital binding energy indicated that with the presence of magnetite, the reduction of selenium were more thorough with elemental selenium and selenide dominant in the solid phase. No selenite was found in the solid phase. This distribution of Se towards lower oxidation states is consistent with what was observed in the typical activated iron system with $Fe^{2+}$ addition. These results indicate that in the presence of magnetite, the incorporation of Al(III) into the oxide coating phase produces a mixed Fe—Al oxide coating, which is reactive with respect to selenate reduction reaction. In fact, with regard to selenate reduction, the introduction of Al(III) appeared to achieve significant faster reaction rate than what was observed in a typical activated iron media under the comparable dosage condition (e.g., 6 hr required to completely reduce selenate in the activated iron media with dissolved $Fe^{2+}$ system). Therefore, addition of Al(III) change the iron oxide phases that significantly improve its reactivity with respect to selenate reduction.

When treating simulated wastewater with the co-presence of nitrate and selenate, the magnetite-coated ZVI with Al(III) addition exhibited preferential reactivity with selenate over nitrate. As shown in the figures, selenate was completely reduced by 1 hr reaction time in all three tests with 2.0, 4.0, and 6.0 mM Al(III) addition, but only about 2%, 6% and 12% of nitrate was reduced by 1 hr. All added $Al^{3+}$ was incorporated into the solid phase by 1 hr reaction time. Clearly, with the addition of aluminum and its incorporation into the solid phase, the resultant mixed Fe—Al oxide now exhibit a strong selectivity to mediate selenate reduction over nitrate reduction.

The results for representative magnetite-coated ZVI/Al (III) systems are described below.

Figure 15A:
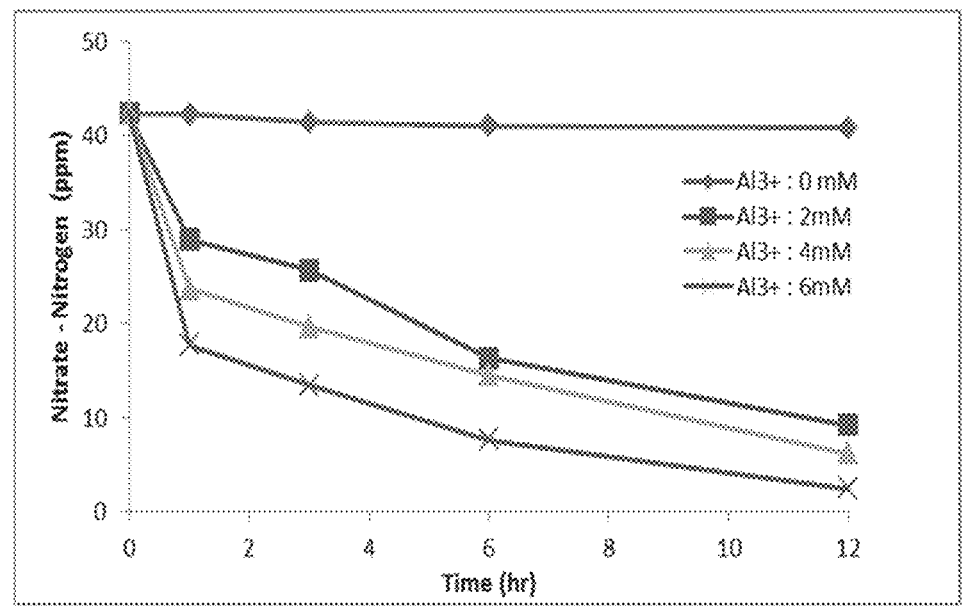
FIG. 15A-15D compares reduction of nitrate (3 mM) by magnetite-coated ZVI using different trivalent aluminum concentrations (0, 2, 4, 6 mM) over time (0, 1, 3, 6, 12 h): nitrate reduction (15A); ferrous iron concentration (15B); pH (15C); and trivalent aluminum concentration (15D). In this magnetite-coated ZVI/Al(III) system, nitrate reduction was slow.
Figure 15B:
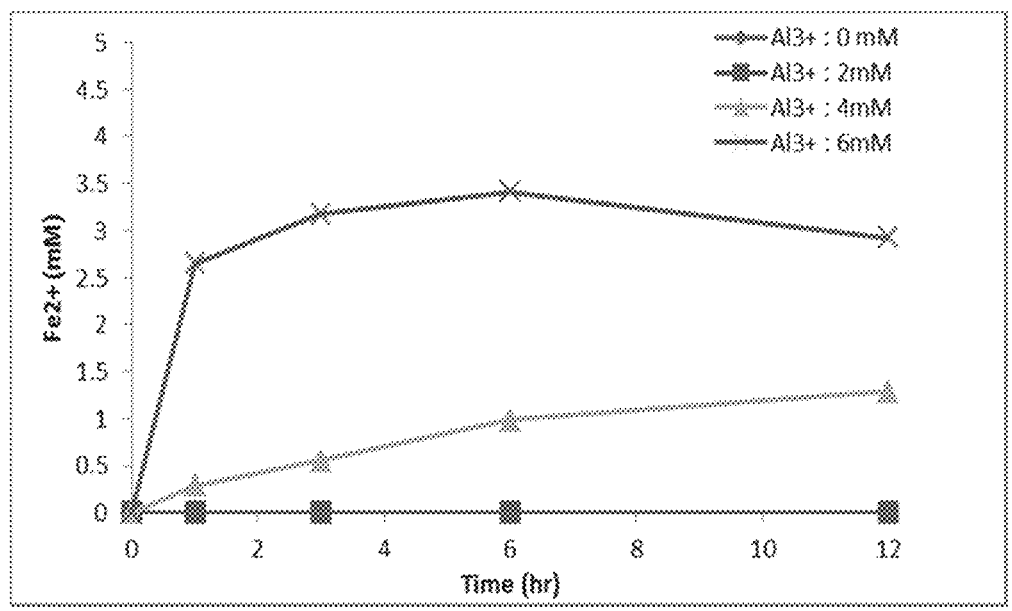
Figure 15C:
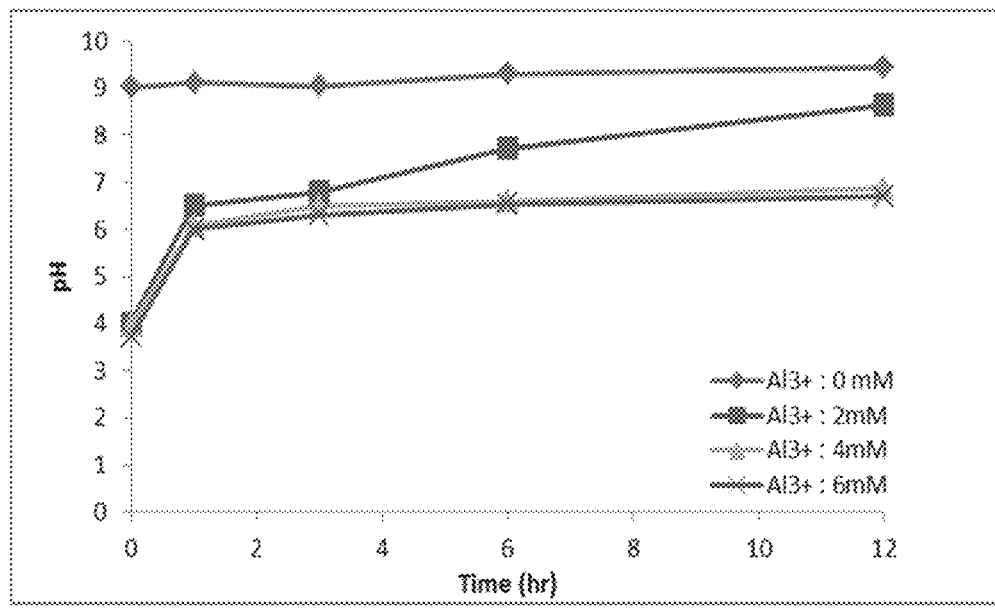
Figure 15D:
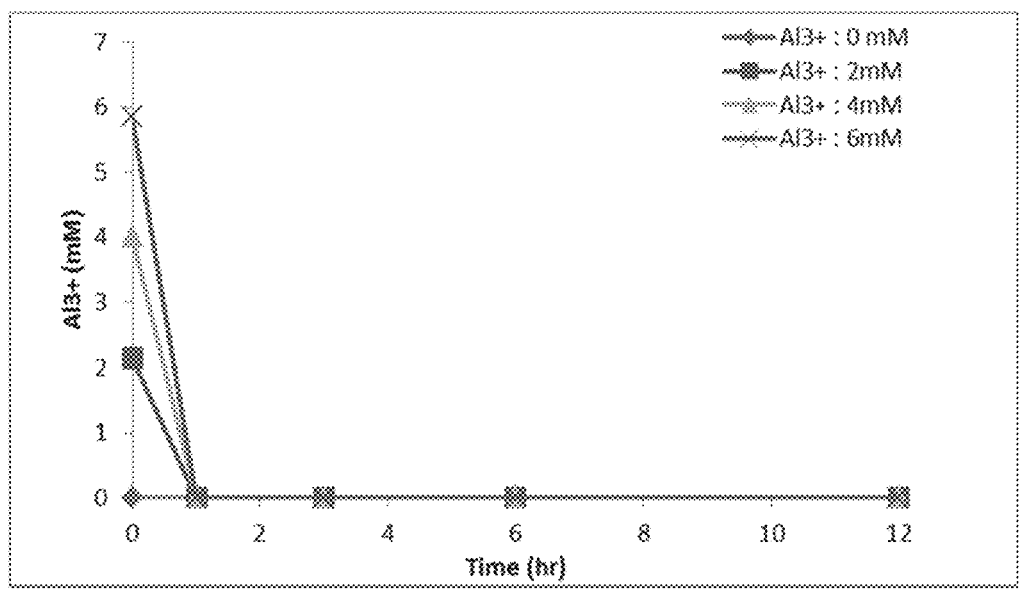

FIG. 15A-15D compares reduction of nitrate (3 mM) by magnetite-coated ZVI using different trivalent aluminum concentrations (0, 2, 4, 6 mM) over time (0, 1, 3, 6, 12 h): nitrate reduction (15A); ferrous iron concentration (15B); pH (15C); and trivalent aluminum concentration (15D). In this magnetite-coated ZVI/Al(III) system, nitrate reduction was slow. FIG. 15A shows relatively slow nitrate reduction in this system compared to the ZVI/Al(III) system as shown in FIG. 8A. FIG. 15D shows a corresponding rapid reduction in trivalent aluminum concentration in the liquid of the reaction system.

Figure 16:
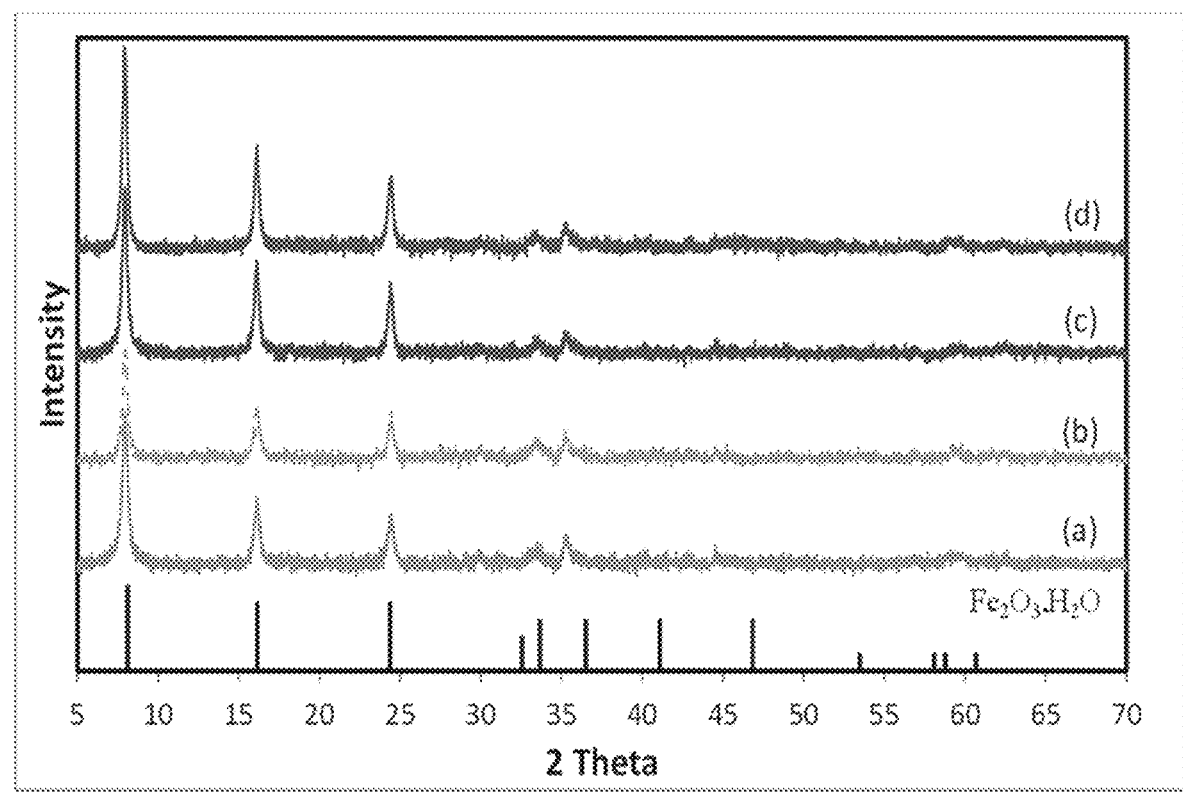
FIG. 16 compares XRD powder patterns for suspension samples collected for nitrate removal by magnetite-coated ZVI with 6 mM trivalent aluminum as a function of reaction time (a) 1 h, (b) 3 h, (c) 6 h, and (d) 12 h, with ferric oxide hydrate ($Fe_2O_3 \cdot H_2O$). The solid suspension phase (FeAlOx) appears to match that of $Fe_2O_3 \cdot H_2O$.

FIG. 16 compares XRD powder patterns for suspension samples collected for nitrate removal by magnetite-coated ZVI with 6 mM trivalent aluminum as a function of reaction time (a) 1 h, (b) 3 h, (c) 6 h, and (d) 12 h, with ferric oxide hydrate ($Fe_2O_3.H_2O$). The solid suspension phase (FeAlOx) appears to match that of $Fe_2O_3.H_2O$.

Figure 17A:
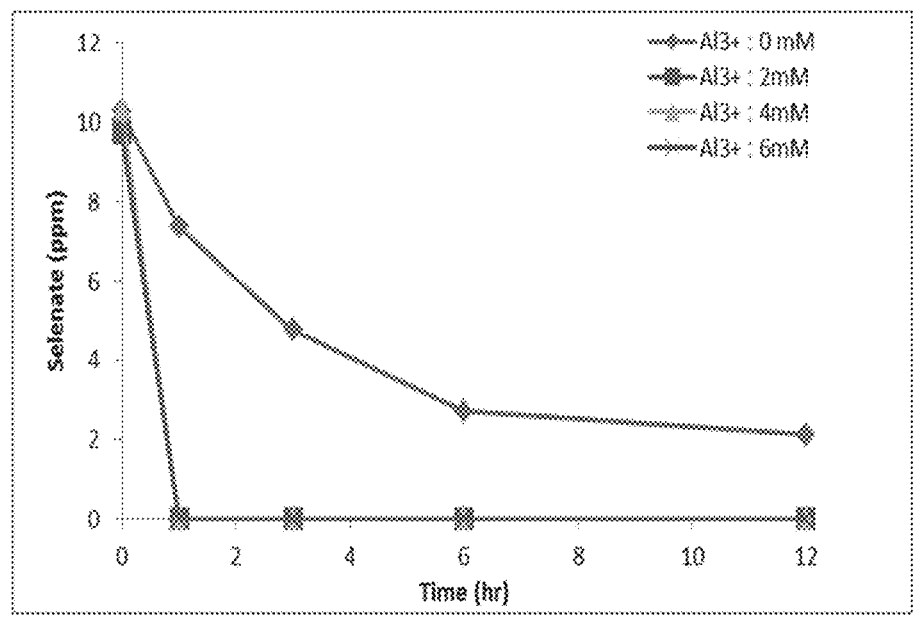
FIG. 17A-17D compare removal of selenate in a representative magnetite-coated ZVI system with various trivalent aluminum concentrations (0, 2, 4, 6 mM) over time (0, 1, 3, 6, 12 h): selenate removal (17A); ferrous iron concentration (17B); pH (17C); and trivalent aluminum concentration (17D). Rapid selenate reduction is observed in the representative magnetite-coated ZVI/Al(III) system.
Figure 17B:
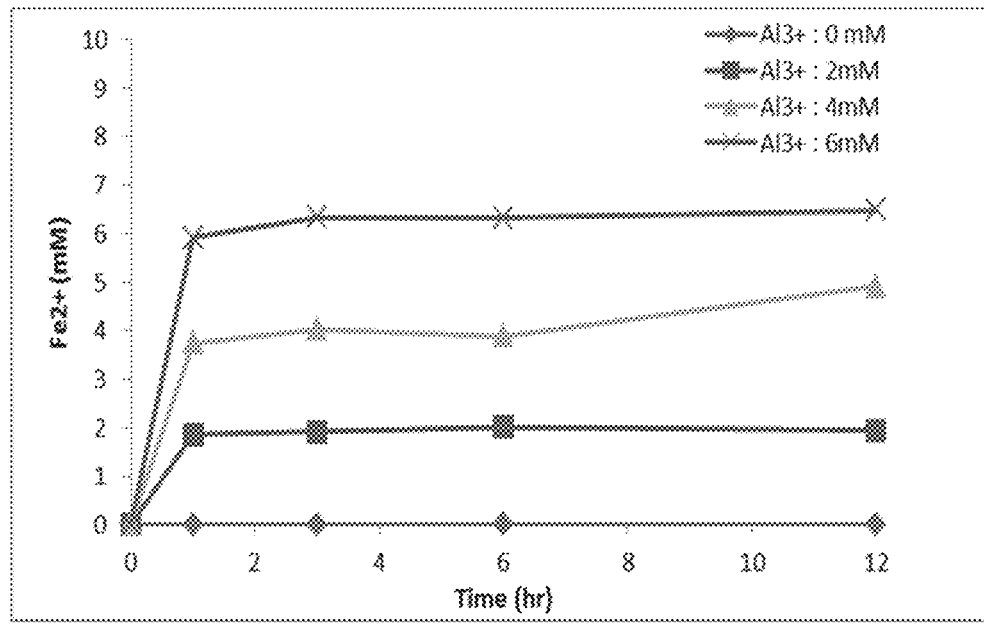
Figure 17C:
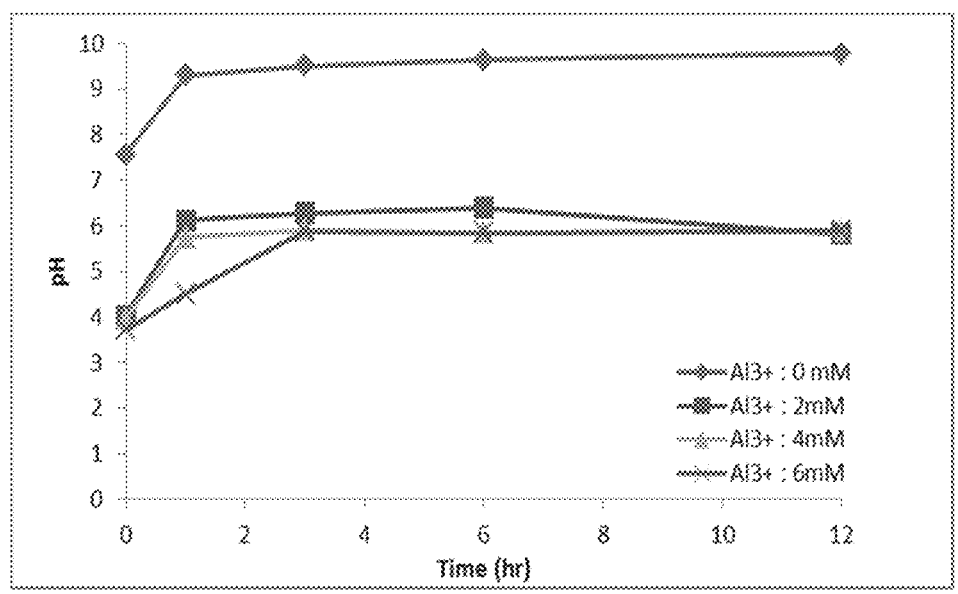
Figure 17D:
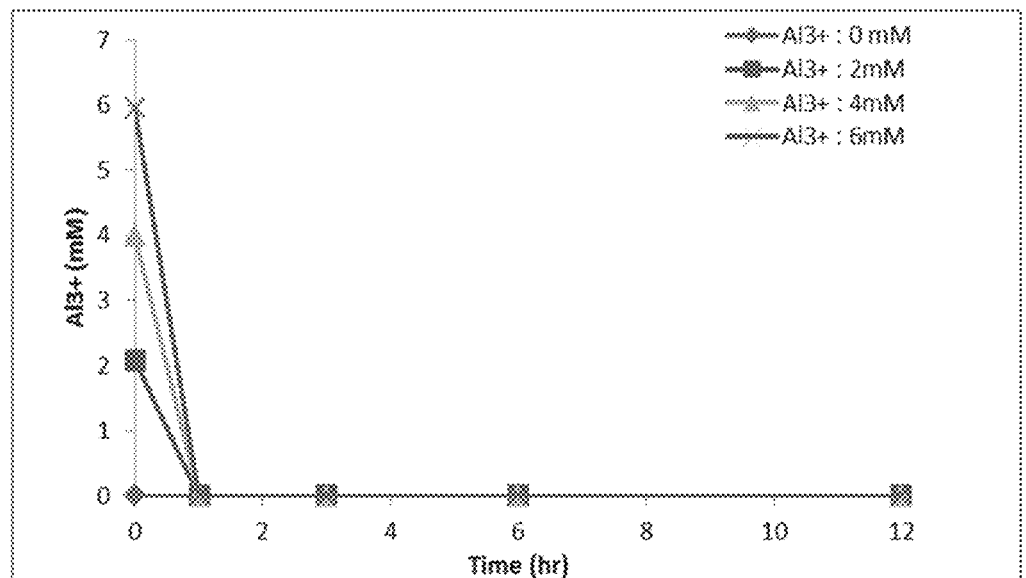
Figure 18A:
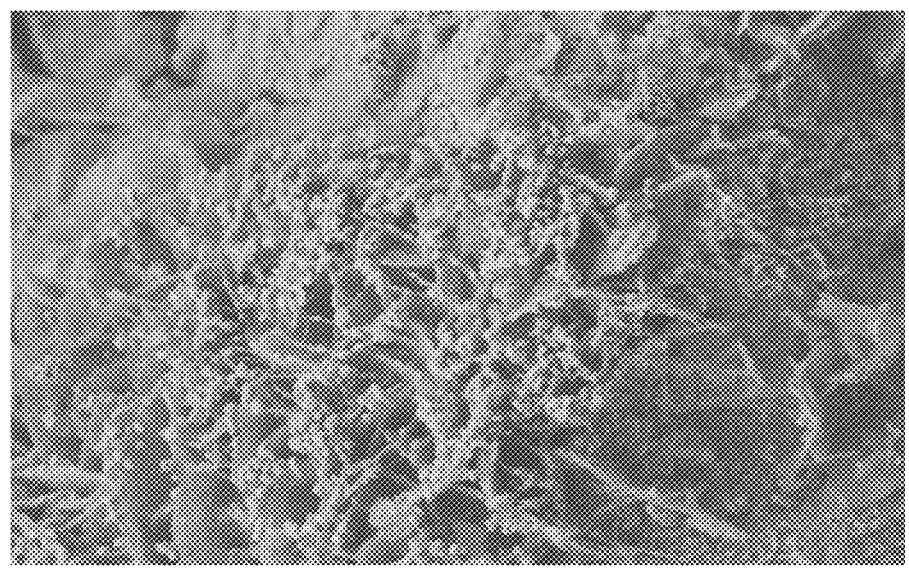
FIG. 18A-18D are scanning electron microscope (SEM) micrographs (5,000×) of reactive media treating selenate (10 mg/L) with 6 mM $Al^{3+}$ in a 5% w/v representative magnetite-coated ZVI/Al(III) system: 1 h (18A), 3 h (18B), 6 h (18C), and 18 h (18D).
Figure 18B:
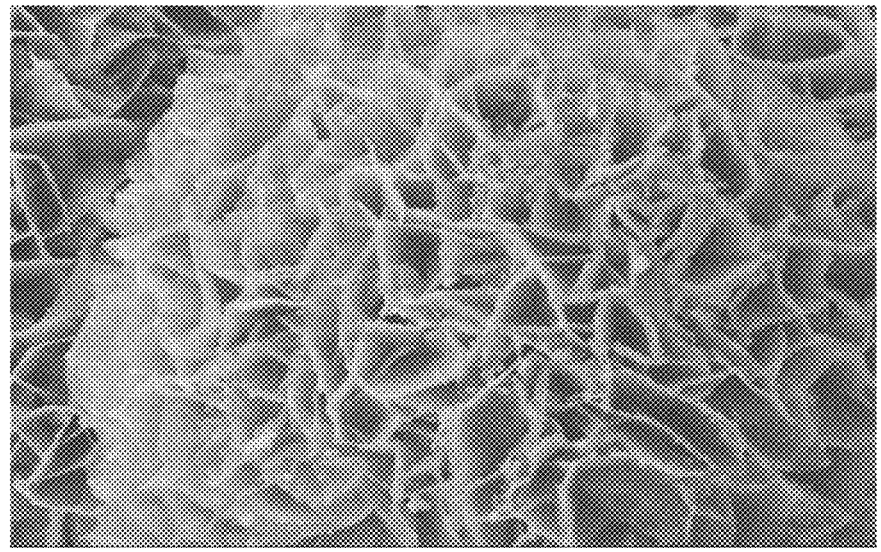
Figure 18C:
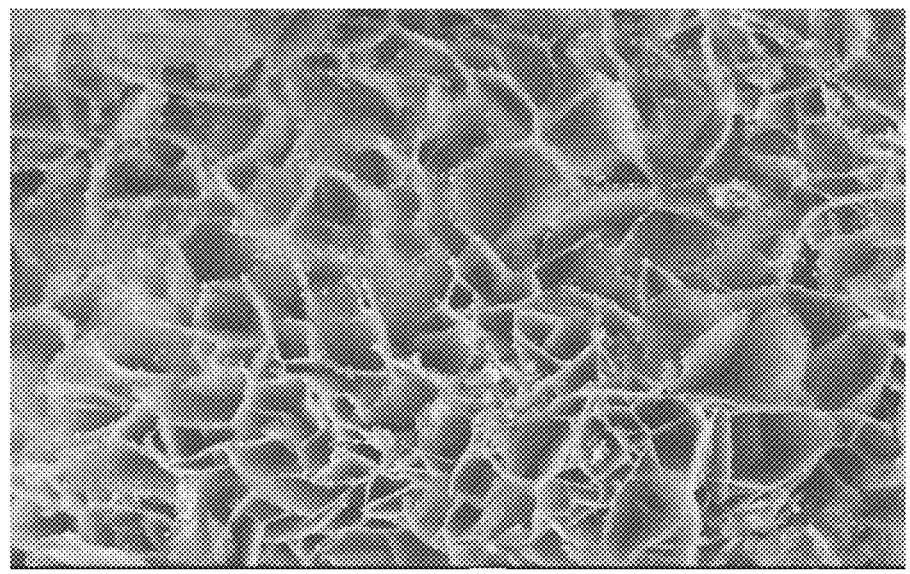
Figure 18D:
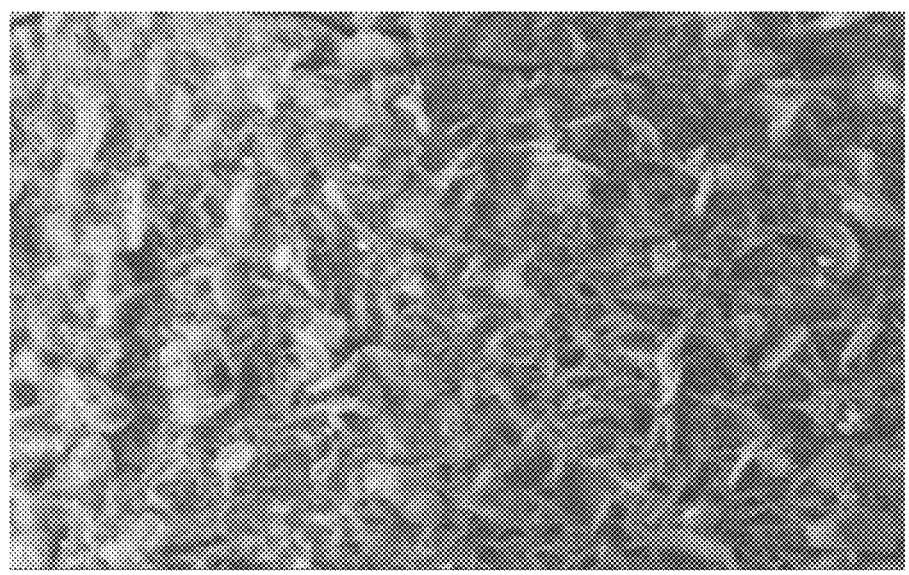

FIG. 17A-17D compare removal of selenate in a representative magnetite-coated ZVI system with various trivalent aluminum concentrations (0, 2, 4, 6 mM) over time (0, 1, 3, 6, 12 h): selenate removal (17A); ferrous iron concentration (17B); pH (17C); and trivalent aluminum concentration (17D). Rapid selenate reduction is observed in the representative magnetite-coated ZVI/Al(III) system. FIG. 17A shows rapid selenate reduction in this system compared to the ZVI/Al(III) system as shown in FIG. 10A. FIG. 17D shows a corresponding rapid reduction in trivalent aluminum concentration in the liquid of the reaction system.

FIG. 18A-18D are scanning electron microscope (SEM) micrographs (5,000×) of reactive media treating selenate (10 mg/L) with 6 mM $Al^{3+}$ in a 5% w/v representative magnetite-coated ZVI/Al(III) system: 1 h (18A), 3 h (18B), 6 h (18C), and 18 h (18D).

Figure 19:
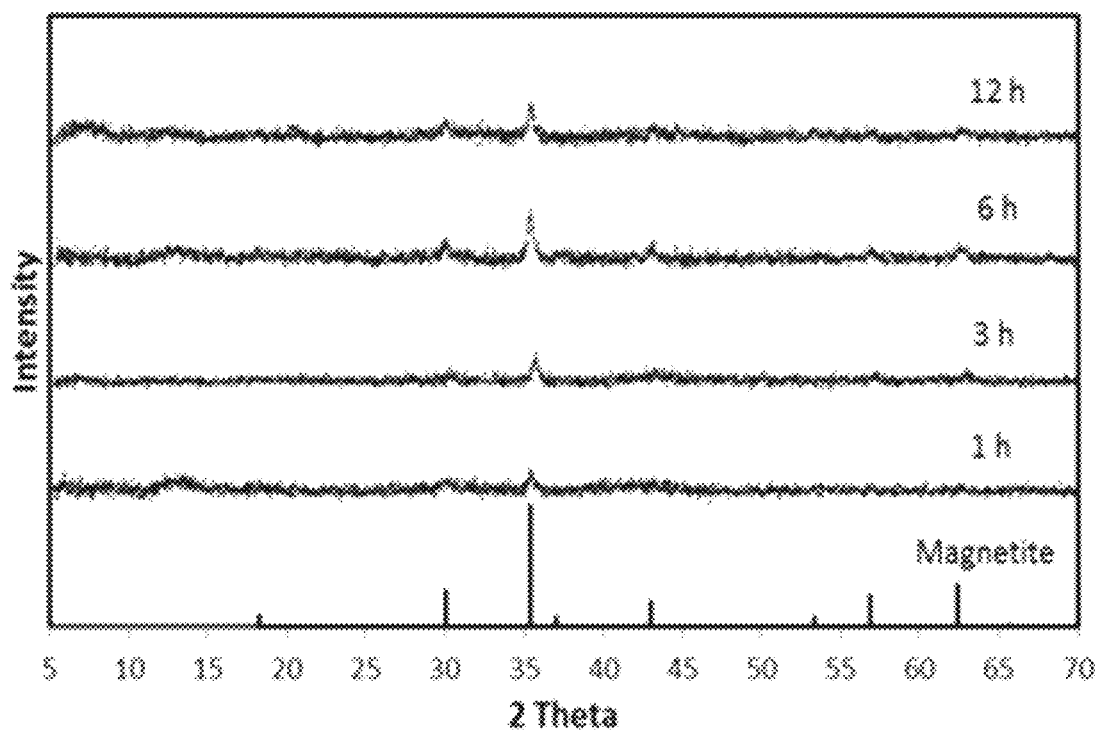
FIG. 19 compares XRD powder patterns for selenate removal by magnetite-coated ZVI with 6 mM trivalent aluminum as a function of reaction time (a) 1 h, (b) 3 h, (c) 6 h, and (d) 12 h.
Figure 20A:
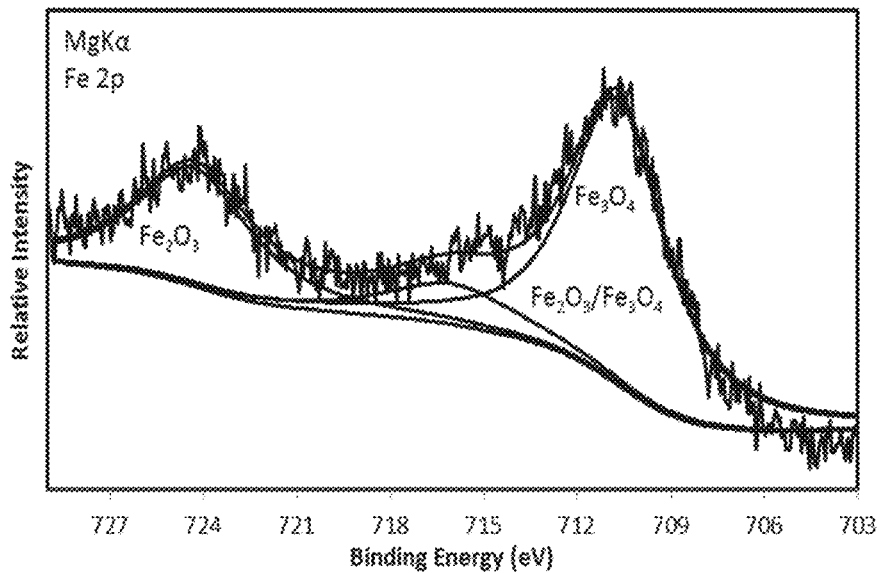
FIG. 20A-20D compare XPS spectra of iron oxides and selenium species on the reactive media: iron oxide species on reactive media after 1 h (20A); iron oxide species on reactive media after 12 h (20B); selenium species on reactive media after 1 h (20C); and selenium species on reactive media after 12 h (20D).
Figure 20B:
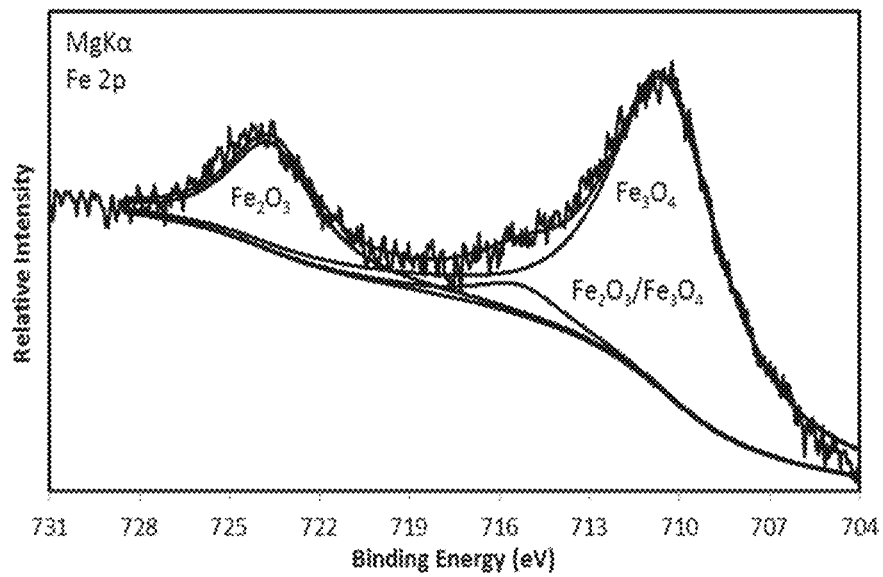
Figure 20C:
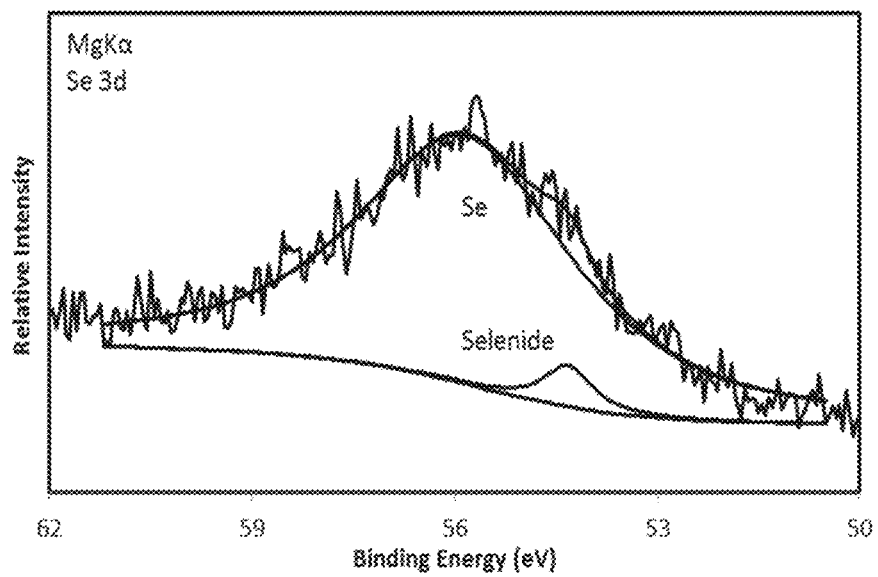
Figure 20D:
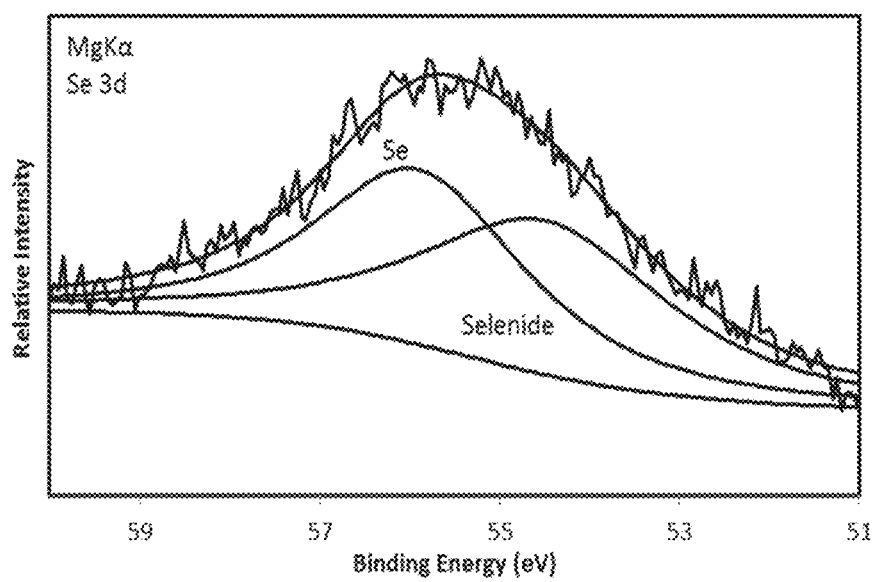

FIG. 19 compares XRD powder patterns for selenate removal by magnetite-coated ZVI with 6 mM trivalent aluminum as a function of reaction time (a) 1 h, (b) 3 h, (c) 6 h, and (d) 12 h.

FIG. 20A-20D compare XPS spectra of iron oxides and selenium species on the reactive media: iron oxide species on reactive media after 1 h (20A); iron oxide species on reactive media after 12 h (20B); selenium species on reactive media after 1 h (20C); and selenium species on reactive media after 12 h (20D). The form of selenium species on the surface of magnetite-coated ZVI at 1 h and 12 h reaction times is summarized in Table 2.

TABLE 2

Selenium species on the surface of magnetite-coated ZVI media.

| Reaction time | Selenium form | |
| --- | --- | --- |
| | $Se^0$ | $Se^{2-}$ |
| 1 h | 96.4 | 3.6 |
| 12 h | 49.0 | 51.0 |

Figure 21A:
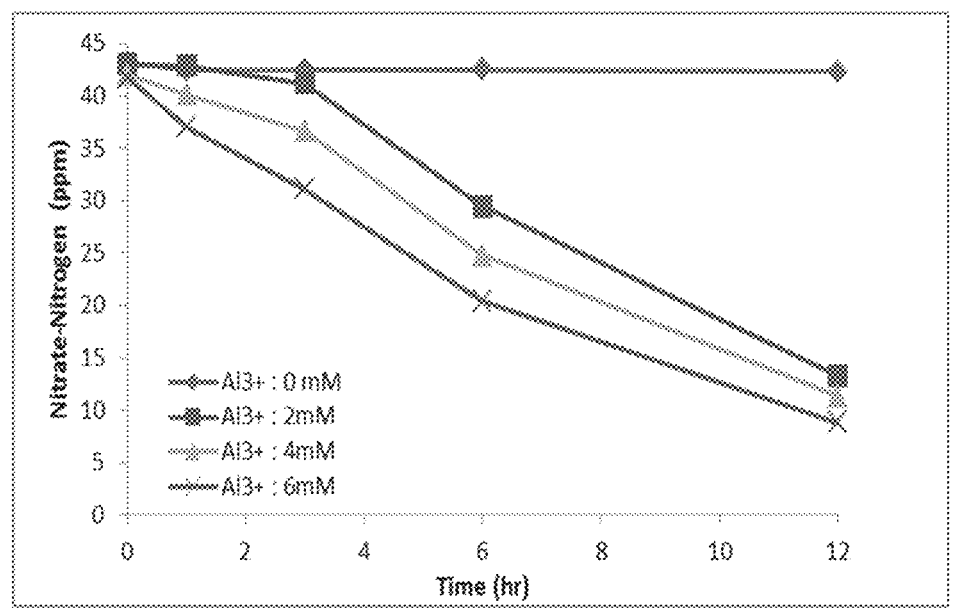
FIG. 21A-21D compare nitrate reduction and selenate removal in a representative magnetite-coated ZVI/Al(III) system with various trivalent aluminum concentration (0, 2, 4, 6 mM) over time (0, 1, 3, 6, and 12 h): nitrate reduction (21A); selenate removal (21B); ferrous iron concentration (21C); and trivalent aluminum concentration (21D). In this magnetite-coated ZVI/Al(III) system, rapid selenium removal and slow nitrate reduction was observed.
Figure 21B:
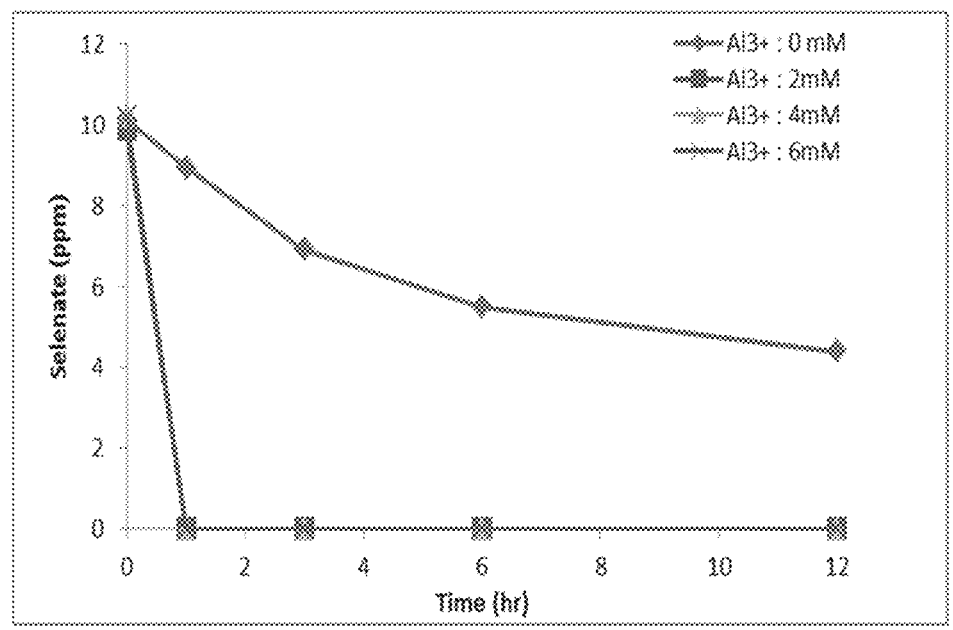
Figure 21C:
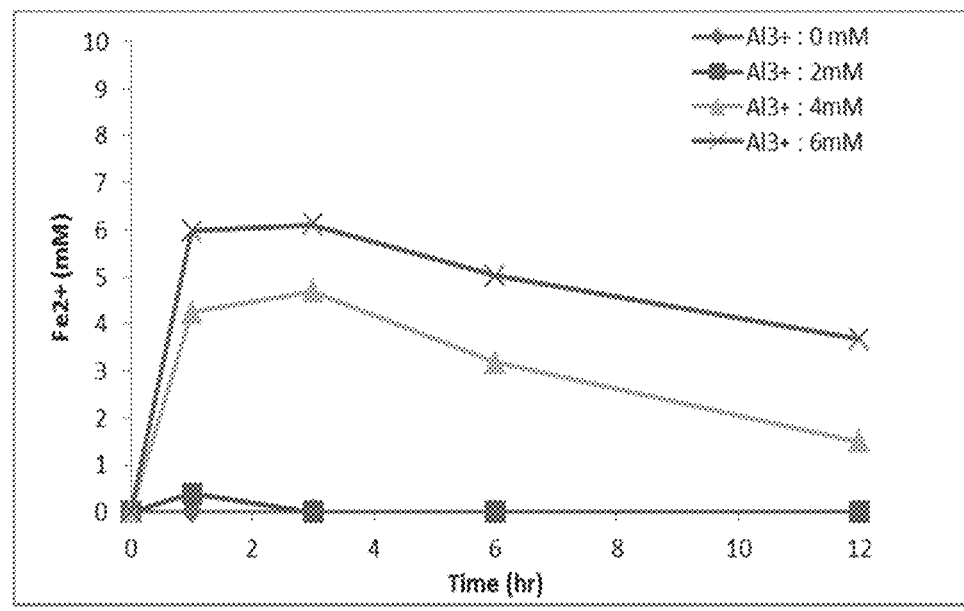
Figure 21D:
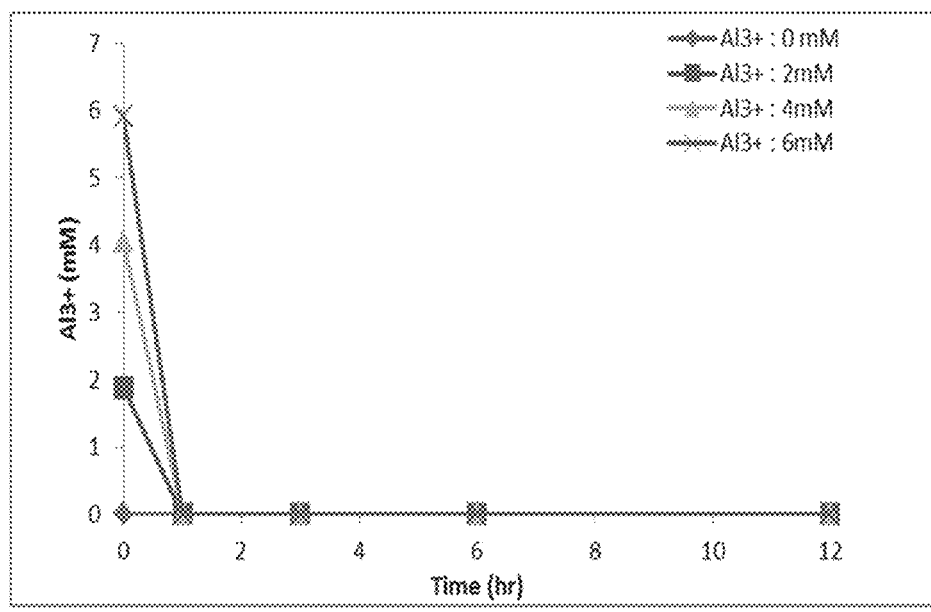

FIG. 21A-21D compare nitrate reduction and selenate removal in a representative magnetite-coated ZVI/Al(III) system with various trivalent aluminum concentration (0, 2, 4, 6 mM) over time (0, 1, 3, 6, and 12 h): nitrate reduction (21A); selenate removal (21B); ferrous iron concentration (21C); and trivalent aluminum concentration (21D). In this magnetite-coated ZVI/Al(III) system, rapid selenium removal and slow nitrate reduction was observed. FIG. 21A shows nitrate reduction suppressed in the presence of selenate compared to nitrate reduction in absence of selenate as shown in FIG. 15A. FIG. 21B shows substantially equivalent selenate reduction in the co-presence nitrate and selenate condition compared to selenate reduction in absence of nitrate as shown in FIG. 17A.

CONCLUSION

The tests conducted as described herein produced results that demonstrate the advantage of adding trivalent aluminum (i.e., Al(III) or $Al^{3+}$) into the activated iron media to improve the media's reactivity with respect to selenate reduction while at the same time to suppress nitrate reduction reaction. The significant differences in term of reactivity between using virgin ZVI (Group I) and magnetite-coated ZVI (Group II) in otherwise comparable conditions implied the importance of the inverse spinel structure of magnetite in maintaining the robust reactivity of the media and in facilitating contaminant reduction reactions. Trivalent aluminum likely interacts with the pre-existing magnetite coating through isomorphic substitution process, maintaining the bulk structure of the magnetite and thus its unique capability in term of facilitating electron transfer and ion migration that are both essential for sustaining redox reactions.

The following examples are provided for the purpose of illustrating, not limiting the invention.

EXAMPLES

Example 1

Conditioning Zero Valent Iron Media

For conditioning 100 g of zero valent iron media were combined with 1.5 g $NaNO_3$ and either 4.37 g of $AlCl_3 \cdot 6H_2O$ or 3.6 g of $FeCl_2 \cdot 4H_2O$ in 1 L plastic bottles to create zero valent iron conditioned with aluminum or iron. Deionized (DI) water was added to each combination to make 1 L samples. Each sample was placed in a rotary mixer and mixed for 24 hours. After mixing, the zero valent iron samples were separated from the liquid and washed three times with DI water. The conditioned zero valent iron samples were left to settle overnight.

Table 3 lists additives of the conditioning phase of Example 1.

TABLE 3

Conditioning Additives.

| Conditioning reagents | Weight (g) | NaNO3 (g) | ZVI (g) |
| --- | --- | --- | --- |
| $AlCl_3 \cdot 6H_2O$ | 4.37 | 1.5 | 100 |
| $FeCl_2 \cdot 4H_2O$ | 3.6 | | |

Example 2

Reaction with Conditioned Zero Valent Iron Media

Each conditioned zero valent iron sample of Example 1 was contacted with 1 L of simulated contaminated water including sulfate, chloride, nitrate, boron, calcium, magnesium, selenium, silicon, and manganese contaminants in a glass beaker. A dosage of aluminum chloride or iron chloride was added to each sample previously conditioned with aluminum chloride or iron chloride, respectively. Table 4 lists different experimental combinations of conditioning and reaction additives.

TABLE 4

Experimental combinations.

| Conditioning stage | Reaction stage |
| --- | --- |
| $Fe^{2+}$ | $Fe^{2+}$ |
| $Al^{3+}$ | $Fe^{2+}$ |
| $Al^{3+}$ | $Al^{3+}$ |
| $Fe^{2+}$ | $Al^{3+}$ |

Table 5 lists the dosage of aluminum chloride or iron chloride added as the reaction additive in each experimental pattern. Sulfate, chloride, and nitrate concentration in each of the simulated contaminated water samples are also summarized in Table 5.

TABLE 5

Aluminum chloride or iron chloride reaction additive concentrations and sulfate, chloride, and nitrate contaminant concentrations.

| Pattern | FeCl$_2$/AlCl$_3$ Dosage (mg/L) | Sulfate (mg/L) | Chloride (mg/L) | NO$_2$—N (mg/L) |
|---|---|---|---|---|
| +++* | 375/394.5 | 3500 | 15000 | 40.0 |
| ---- | 50/52.6 | 1500 | 7500 | 1.1 |
| 0000 | 212.5/223.6 | 2500 | 11250 | 24.5 |
| ---* | 50/52.6 | 1500 | 7500 | 40.0 |
| +--- | 375/394.5 | 1500 | 7500 | 1.1 |
| +-+- | 375/394.5 | 1500 | 15000 | 1.1 |

TABLE 6

Contaminant concentration in the simulated contaminant water.

| Elements | Unit | Concentration |
|---|---|---|
| Boron | mg/L | 160 |
| Calcium | mg/L | 2,300 |
| Magnesium | mg/L | 2,550 |
| Selenium | mg/L | 1.2 |
| Silicon | mg/L | 30 |
| Mn | mg/L | 5 |

FIGS. 1-6 show the reaction time for one hundred percent removal of selenium from each experimental sample. Table 7 lists the selenium half-life of each sample, where half-life is calculated as the time in hours to remove 50% of the selenium concentration in the simulated contaminated water.

TABLE 7

Selenium half-life for each experimental sample.

| | | | | | Metal Conditioning + Metal Dosing - Se Half-Life (Hr) | | | |
|---|---|---|---|---|---|---|---|---|
| Pattern | FeCl$_3$/AlCl$_3$ Dosage (mg/L) | Sulfate (mg/L) | Chloride (mg/L) | NO$_3$—N (mg/L) | Al + Fe ICP-OES | Fe + Fe ICP-OES | Al + Al ICP-OES | Fe + Al ICP-OES |
| +++* | 375/394.5 | 3,500 | 15,000 | 40.0 | 1.66 | 1.94 | 0.96 | 1.21 |
| ---- | 50/52.6 | 1,500 | 7,500 | 1.1 | 0.98 | 1.13 | 0.70 | 1.09 |
| 0000 | 212.5/223.6 | 2,500 | 11,250 | 24.5 | 1.19 | 1.46 | 0.98 | 1.17 |
| ---* | 50/52.6 | 1,500 | 7,500 | 40.0 | 1.62 | 1.60 | 1.38 | 1.22 |
| +--- | 375/394.5 | 1,500 | 7,500 | 1.1 | 0.69 | 0.57 | 0.56 | 0.77 |
| +-+- | 375/394.5 | 1,500 | 15,000 | 1.1 | 0.97 | 1.08 | 0.38 | 0.97 |

As shown in the graphs of FIGS. 1-6 and the data summarized in Table 7, samples conditioned with aluminum chloride and reacted with aluminum chloride generally removed selenium faster than samples conditioned or reacted with iron chloride. Accordingly, conditioning additives and reaction additives each comprising an aluminum salt provide faster selenium removal than each of an iron salt conditioning additive and an iron salt reaction additive.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms (i.e., to mean "including but not limited to"). Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed. For example, those skilled in the art may recognize that the method, and components thereof, according to the present disclosure may further comprise a network or systems or be a component of a system comprising zero valent iron media. It is therefore to be understood that the embodiments described herein are presented by way of example only and that, within the scope of the appended claims and equivalents thereto; the disclosed embodiments may be practiced otherwise than as specifically described. The present systems and methods are directed to each individual feature, system, or method described herein. In addition, any combination of two or more such features, systems, or methods, if such features, systems, or methods are not mutually inconsistent, is included within the scope of the present disclosure. The steps of the methods disclosed herein may be performed in the order illustrated or in alternate orders and the methods may include additional or alternative acts or may be performed with one or more of the illustrated acts omitted.

Further, it is to be appreciated that various alterations, modifications, and improvements will readily occur to those skilled in the art. Such alterations, modifications, and improvements are intended to be part of this disclosure, and are intended to be within the spirit and scope of the disclosure. In other instances, an existing facility may be modified to utilize or incorporate any one or more aspects of the methods and systems described herein. Thus, in some instances, the systems may involve zero valent iron media. Accordingly the foregoing description and figures are by way of example only. Further the depictions in the figures do not limit the disclosures to the particularly illustrated representations.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for reducing a concentration of one or more contaminants in contaminated water having a first concentration of contaminants, the method comprising:
   providing zero valent iron media, at least partially coated with an iron oxide compound, in a reactor vessel;
   contacting the zero valent iron media with a conditioning additive comprising a soluble aluminum salt to produce a conditioned zero valent iron media;
   contacting the contaminated water with the conditioned zero valent iron media in the reactor vessel to produce a product water having a second concentration of contaminants lower than the first concentration of contaminants;
   introducing a reaction additive comprising a soluble aluminum salt into the reactor vessel; and
   maintaining a concentration of aluminum ions within the reactor vessel within a predetermined range by monitoring and adjusting a flow rate of the reaction additive with a process control subsystem,
   the process control subsystem comprising:
   a first sensor system configured to measure at least one of a flow rate of a solution being received in the reactor vessel through at least one inlet and a concentration of one or both of the conditioning additive and the reaction additive; and
   a second sensor system configured to measure a concentration of one or both of the conditioning additive and the reaction additive in the solution within the reactor vessel,
   a control module being in electrical communication with the first and second sensor systems and configured to receive information from the first and second sensor systems.

2. The method of claim 1, wherein contacting the zero valent iron media with the conditioning additive comprises contacting the zero valent iron media with aluminum chloride.

3. The method of claim 1, wherein contacting the zero valent iron media with the conditioning additive comprises contacting the zero valent iron media with aluminum chloride and sodium nitrate.

4. The method of claim 1, wherein introducing the reaction additive comprises introducing aluminum chloride.

5. The method of claim 1, wherein producing the product water having the second concentration of contaminants comprises reducing a concentration of one or more contaminants selected from the group consisting of selenium, arsenic, cadmium, chromium III, chromium VI, cobalt, copper, lead, mercury, antimony, molybdenum, nickel, titanium, tungsten, vanadium, and zinc in the contaminated water.

6. The method of claim 1, wherein providing zero valent iron media in the reactor vessel comprises providing zero valent iron media in one of a packed bed, a fluidized bed, and a mixed bed.

7. The method of claim 1, wherein contacting the contaminated water with the conditioned zero valent iron media comprises introducing contaminated water originating from a source selected from the group consisting of flue-gas desulfurization waste water, petroleum refining process waste water, mining operations waste water, surface water, and ground water.

8. The method of claim 1, wherein the soluble aluminum salt is selected from the group consisting of aluminum chloride and aluminum sulfate.

9. A method for selectively reducing the concentration of selenate in contaminated water having a first concentration of selenate and a first concentration of nitrate, the method comprising:
   providing zero valent iron media, at least partially coated with an iron oxide compound, in a reactor vessel;
   contacting the zero valent iron media with a conditioning additive comprising a soluble aluminum salt to produce a conditioned zero valent iron media;
   introducing a reaction additive comprising a soluble aluminum salt into the reactor vessel and maintaining a concentration of aluminum ions within the reactor vessel within a predetermined range by monitoring and adjusting a flowrate of the reaction additive with a process control subsystem; and
   contacting the contaminated water with the conditioned zero valent iron media in the reactor vessel to produce a product water having a second concentration of selenate and a second concentration of nitrate,
   wherein the second concentration of selenate is less than the first concentration of selenate,
   wherein the second concentration of nitrate is less than the first concentration of nitrate, and
   wherein the decrease in selenate concentration is greater than the decrease in nitrate concentration, and
   wherein the process control subsystem comprises:
   a first sensor system configured to measure at least one of a flow rate of a solution being received in the reactor vessel through at least one inlet and a concentration of one or both of the conditioning additive and the reaction additive, and
   a second sensor system configured to measure a concentration of one or both of the conditioning additive and the reaction additive in the solution within the reactor vessel,
   a control module being in electrical communication with the first and second sensor systems and configured to receive information from the first and second sensor systems.

10. The method of claim 9, wherein the soluble aluminum salt is selected from the group consisting of aluminum chloride and aluminum sulfate.

11. The method of claim 9, wherein contacting the zero valent iron media with the conditioning additive comprises contacting the zero valent iron media with a soluble aluminum salt and sodium nitrate.

12. The method of claim 9, wherein the contaminated water further comprises one or more contaminants selected from the group consisting of arsenic, cadmium, chromium III, chromium VI, cobalt, copper, lead, mercury, antimony, molybdenum, nickel, titanium, tungsten, vanadium, and zinc.

13. The method of claim 9, wherein contacting the contaminated water with the conditioned zero valent iron media comprises introducing contaminated water originating from a source selected from the group consisting of flue-gas desulfurization waste water, petroleum refining process waste water, mining operations waste water, surface water, and ground water.

14. The method of claim 9, wherein providing zero valent iron media in the reactor vessel comprises providing zero valent iron media in one of a packed bed, a fluidized bed, and a mixed bed.

* * * * *